(12) United States Patent
Willemsen et al.

(10) Patent No.: US 11,296,677 B2
(45) Date of Patent: Apr. 5, 2022

(54) FAST, HIGHLY ACCURATE, FULL-FEM SURFACE ACOUSTIC WAVE SIMULATION

(71) Applicant: Resonant, Inc., Santa Barbara, CA (US)

(72) Inventors: Balam Willemsen, Lexington, MA (US); Viktor Plesski, Gorgier (CH); Julius Koskela, Helsinki (FI)

(73) Assignee: RESONANT, INC., Santa Barbara, CA (US)

(*) Notice: Subject to any disclaimer, the term of this patent is extended or adjusted under 35 U.S.C. 154(b) by 168 days.

(21) Appl. No.: 16/711,205

(22) Filed: Dec. 11, 2019

(65) Prior Publication Data

US 2020/0119717 A1    Apr. 16, 2020

Related U.S. Application Data

(63) Continuation-in-part of application No. 16/653,743, filed on Oct. 15, 2019, now Pat. No. 11,182,522.
(Continued)

(51) Int. Cl.
*H03H 9/64* (2006.01)
*G06F 30/3308* (2020.01)
*G06F 30/398* (2020.01)

(52) U.S. Cl.
CPC ....... *H03H 9/6463* (2013.01); *G06F 30/3308* (2020.01); *G06F 30/398* (2020.01); *H03H 9/6403* (2013.01)

(58) Field of Classification Search
CPC .............. H03H 9/6463; H03H 9/6403; G06F 30/3308; G06F 30/398; G06F 2119/10; G06F 30/367; G06F 30/23
See application file for complete search history.

(56) References Cited

U.S. PATENT DOCUMENTS 7,660,480 B1    2/2010   Wu et al.
7,844,421 B2   11/2010   Yoon et al.
(Continued)

FOREIGN PATENT DOCUMENTS

JP    03-033632 A    2/1991
JP    2007-122242 A6   5/2007
JP    2015-536059 A2  12/2015

OTHER PUBLICATIONS

"3D FEM simulation of SAW resonators using hierarchical cascading technique and general purpose graphic processing unit", Xinyi Li1, Jingfu Bao, Luyan Qiu, Naoto Matsuoka Tatsuya Omori, and Ken-Ya Hashimoto, Japanese Journal of Applied Physics 58, SGGC05 (2019), Jun. 13, 2019.*
(Continued)

*Primary Examiner* — Nha T Nguyen
(74) *Attorney, Agent, or Firm* — Foley & Lardner LLP

(57) ABSTRACT

The present disclosure provides systems and methods for scalable and parallel computation of hierarchical cascading in finite element method (FEM) simulations of surface acoustic wave (SAW) devices. Different computing units of a cluster or cloud service may be assigned to independently model different core blocks or combinations of core blocks for iterative cascading to generate a model of the SAW devices. Similarly, frequency ranges may independently be assigned to computing units for modeling and analysis of devices, drastically speeding up computation.

20 Claims, 26 Drawing Sheets
(15 of 26 Drawing Sheet(s) Filed in Color)

Related U.S. Application Data which is a continuation-in-part of application No. 15/406,600, filed on Jan. 13, 2017.

(60) Provisional application No. 62/778,168, filed on Dec. 11, 2018, provisional application No. 62/778,129, filed on Dec. 11, 2018, provisional application No. 62/746,937, filed on Oct. 17, 2018, provisional application No. 62/380,931, filed on Aug. 29, 2016.

(56) References Cited

U.S. PATENT DOCUMENTS

| | | |
|---|---|---|
| 2006/0149513 A1 | 7/2006 | Yoon |
| 2006/0284703 A1 | 12/2006 | Iwasaki et al. |
| 2008/0172210 A1 | 7/2008 | Yoon et al. |
| 2008/0228452 A1 | 9/2008 | Yoon |
| 2010/0063782 A1* | 3/2010 | Yoon ........................ G06F 30/23 703/2 |
| 2015/0127311 A1 | 5/2015 | Cipolla |
| 2018/0062604 A1 | 3/2018 | Koskela et al. |

OTHER PUBLICATIONS

International Search Report and Written Opinion on PCT PCT/US2019/065784 dated Apr. 6, 2020 (16 pages).
Koskela, Julius et al: "Hierarchical Cascading Algorithm for 2-D FEM Simulation of Finite SAW Devices", IEEE Transactions on Ultrasonics, Ferroelectrics and Frequency Control, vol. 65, No. 10, Jul. 2, 2018, pp. 1933-1942, XP011690819, DOI: 10.1109/TUFFC.2018.2852603 [retrieved on Oct. 3, 2018].
Koskela, Julius et al: "Hierarchical Cascading in FEM Simulations of SAW Devices", Proceedings of the IEEE International Ultrasonic Symposium, Oct. 22, 2018 (11 pages).
MATLAB: "Cluster computing for MATLAB Users", YouTube, Apr. 28, 2017 (1 page); Retrieved from the Internet: URL: https://www.youtube.com/watch?v=6mDBrrlYpKM (retrieved Feb. 28, 2020).
Non-Final Office Action on U.S. Appl. No. 15/406,600 dated Feb. 21, 2020 (14 pages).
Ando et al., "Optimum Design of Ladder Type SAW Filter Using a Simulated Annealing," 2007, vol. 20, No. 9, (pp. 367-375).
Appelo, Daniel, "Absorbing Layers and Non-Reflecting Boundary Conditions for Wave Propagation Problems," Doctorial Thesis, Oct. 31, 2005, Stockholm, Sweden (pp. 1-127).
Becache et al., "Stability of perfectly matched layers, group velocities and anisotropic waves," Journal of Computational Physics, 2003, vol. 188 (pp. 399-433).
International Preliminary Report on Patentability on PCT Appl. Ser. No. PCT/US2017/047019 dated Mar. 5, 2019 (10 pages).
International Search Report and Written Opinion on PCT Appl. Ser. No. PCT/US2017/047019 dated Dec. 1, 2017 (11 pages).
JP Office Action on JP Appl. Ser. No. 2019-510872 dated Dec. 17, 2020 (4 pages).
JP Search Report on JP Appl. Ser. No. 2019-510872 dated Dec. 7, 2020 (50 pages).
Karim et al., "Finite Element Analysis in Combination Perfectly Matched Layer to the Numerical Modeling of Acoustic Devices in Piezoelectric Material," Applied Mathematics, 2013, vol. 4 (pp. 64-71).
KR Office Action on KR Appl. Ser. No. 10-2019-7007335 dated Aug. 28, 2020 (4 pages).
KR Written Opinion on KR Appl. Ser. No. 10-2019-7007335 dated Oct. 20, 2020 (5 pages).
Zheng et al., "Anisotropic Perfectly Matched Layers for Elastic Waves in Cartesian and Curvilinear," 6 Coordinates, MIT Earth Resources Laboratory Industry Consortium Report, Dec. 31, 2002, (pp. 1-18).

\* cited by examiner

FAST, HIGHLY ACCURATE, FULL-FEM SURFACE ACOUSTIC WAVE SIMULATION

RELATED APPLICATIONS

The present application claims the benefit of and priority to U.S. Provisional Application No. 62/778,129 entitled "Fast, Highly Accurate, Full-FEM Surface Acoustic Wave Simulation," filed Dec. 11, 2018; and also claims priority as a continuation-in-part to U.S. Nonprovisional patent application Ser. No. 16/653,743, entitled "Hierarchical Cascading in FEM Simulations of SAW devices," filed Oct. 15, 2019, which claims the benefit of and priority to U.S. Provisional Patent Application No. 62/778,168, entitled "Hierarchical Cascading in FEM Simulations of SAW Devices," filed Dec. 11, 2018 and also claims priority as a continuation-in-part to U.S. Nonprovisional patent application Ser. No. 15/406,600, entitled "Hierarchical Cascading in Two-Dimensional Finite Element Method Simulation of Acoustic Wave Filter Devices," filed Jan. 13, 2017, which claims priority to U.S. Provisional Application No. 62/380,931, entitled "Hierarchical Cascading in Two-Dimensional Finite Element Method Simulation of Acoustic Wave Filter Devices," filed Aug. 29, 2016 and also claims the benefit of and priority to U.S. Provisional Patent Application No. 62/746,937, entitled "Hierarchical Cascading in FEM Simulations of SAW Devices," filed Oct. 17, 2018, the entirety of each of which is incorporated by reference herein.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Fast development of surface acoustic wave (SAW) filters, which is becoming ever more complicated, demands precise and universal simulation tools. The finite element method (FEM) is very attractive due to its remarkable generality. FEM can handle arbitrary materials and crystal cuts, different electrode shapes, and structures including multiple metal and dielectric layers. However, the application of FEM to the SAW devices has been hampered by 1) the difficulty of modeling the effectively semi-infinite substrate crystal, and 2) the large memory consumption and slow computation times. Accordingly, in practice, simulation accuracy has been limited by memory and computation constraints, limiting the effectiveness of these techniques.

Furthermore, simulation calculation may require many millions of discrete calculations. For example, given a typical quadplexer device with 32 unique SAW resonators, simulating output characteristics across a wide frequency band (e.g. 700 MHz at 0.5 MHz, or 1401 frequency points) at a rate of one calculation per second, may require hours (32*1401*1 second=44,832 seconds=12.45 hours of simulation time). This may be impractical for many uses, particularly as designs are updated or modified, requiring repeated re-simulation.

SUMMARY

The systems and methods discussed herein provide for hierarchical cascading in FEM simulations of SAW devices, which offers drastically reduced memory consumption and simulation times. In some implementations, iterative hierarchical cascading may also be applied to three-dimensional simulations of SAW devices, which may otherwise be too complex for FEM simulations due to the high number of cross-sectional degrees-of-freedom involved.

Advantageously, hierarchical cascading allows for independent calculation of sub-models at different frequency ranges and/or for independent calculation of different portions of the models (e.g. core blocks). This allows for parallelization and scalability, while avoiding problems of synchronization between independent computing units that occur during some implementations of parallel computing.

Optional features of one aspect may be combined with any other aspect.

BRIEF DESCRIPTION OF THE DRAWINGS

The patent or application file contains at least one drawing executed in color. Copies of this patent or patent application publication with color drawings will be provided by the Office upon request and payment of the necessary fee.

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

The systems and methods discussed are directed to hierarchical cascading and iterative hierarchical cascading, techniques to greatly reduce the computational time and memory requirements for finite element modeling (FEM) of surface acoustic wave (SAW) devices.

Fast development of SAW filters, which is becoming ever more complicated, demands precise and universal simulation tools. FEM is very attractive as a simulation and analysis technique due to its remarkable generality. FEM can handle arbitrary materials and crystal cuts, different electrode shapes, and structures including multiple metal and dielectric layers. However, the application of FEM to the SAW devices has been hampered by 1) the difficulty of modeling the effectively semi-infinite substrate crystal, and 2) the large memory consumption and slow computation times. Accordingly, in practice, simulation accuracy has been limited by memory and computation constraints, limiting the effectiveness of these techniques.

In many implementations, a perfectly matched layer (PML) technique may be used to model the substrate crystal. Certain piezo-electric materials with unsuitable anisotropy are prone to instabilities in implementations using a convolution stretched-coordinate PML (C-PML) approach, and they remain difficult to simulate. Unfortunately, this anomalic category includes several technologically important SAW substrates, such as 128° YX-cut $LiNbO_3$ in two dimensions, and 42° YX-cut $LiTaO_3$ in three dimensions. A multi-axial PML (M-PML) technique may be used in some implementations to provide an acceptable, albeit less efficient solution.

Figure 1A:
FIG. 1A is a model of an implementation of a surface acoustic wave device.

Referring briefly to FIG. 1A, illustrated is a model of an implementation of a SAW device 100. In non-hierarchical FEM analysis, the simulation covers the entire geometry of the device (open boundary conditions are mimicked by surrounding the simulation domain with an artificial computational material or PML, which absorbs the waves incident to the layer). A practical FEM model of the regions around a single electrode may include thousands of finite elements with hundreds of variables, resulting in tens or hundreds of thousands of potential variables or degrees-of-freedom; a FEM model of a complete SAW devices with hundreds of electrodes can include millions of potential variables, impractical for use in even the fastest computing systems.

Figure 1B:
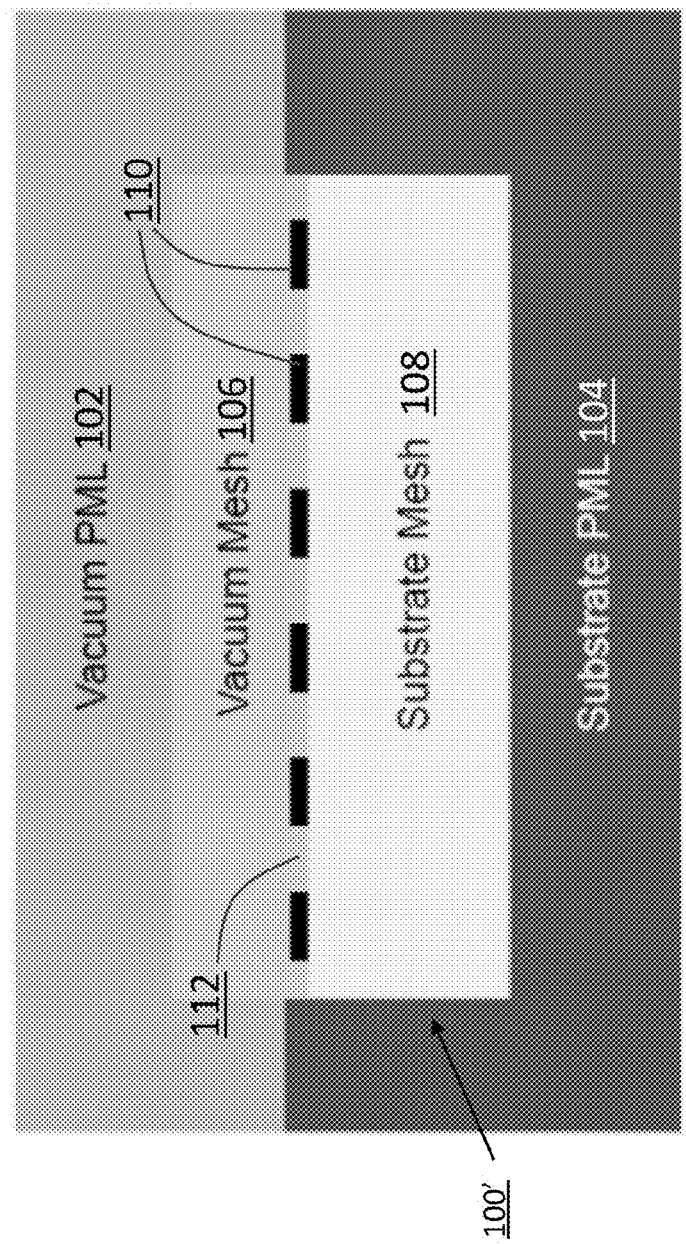
FIG. 1B is an abstracted illustration of the implementation of the surface acoustic wave device of FIG. 1A.

FIG. 1B is an abstracted illustration 100' (not to scale) of the implementation of the SAW device of FIG. 1A. The SAW device 100', which may be a filter, resonator, coupling element, or any other such device, may comprise a finite array finite array of conductive electrodes 110 (e.g., the interdigitated metal fingers of a resonator) and a semi-infinite substrate crystal 108. One or more dielectric or piezoelectric layers below, above, and between the electrodes 110, may also be modeled. The SAW structure 100' may also comprise a passivation layer (e.g., $SiO_2$) 112 disposed over the electrodes 110 and substrate 108. A regional domain consisting of the electrodes 110, a portion of the substrate 108 adjacent the electrodes 110, and a portion of a vacuum 106 above the electrodes 110 may be defined and modeled in fine detail via a mesh. The regional domain may be surrounded by an artificial computational material consisting of a substrate PML 104 and a vacuum PML 102, which interfaces smoothly with the modeled domain and which has the property that incident propagating acoustic waves are converted into exponentially decaying acoustic waves. The regional domain, along with the substrate PML 104 and vacuum PML 102, are computationally meshed and a frequency response is computed using the FEM. While this approach is unstable in some substrates with unsuitable anisotropy, in many implementations, using a PML is a very efficient solution to the open boundary problem.

Although the use of PMLs addresses the open boundary condition problem, the second problem of addressing the large number of degrees-of-freedom remains. A practical FEM model of the regions around a single electrode may contain thousands of finite elements on the order of 1000-10,000 unknown variables. Thus, the FEM model of a complete SAW structure with several hundreds of electrodes can be huge; up to millions of equations.

Figure 1C:
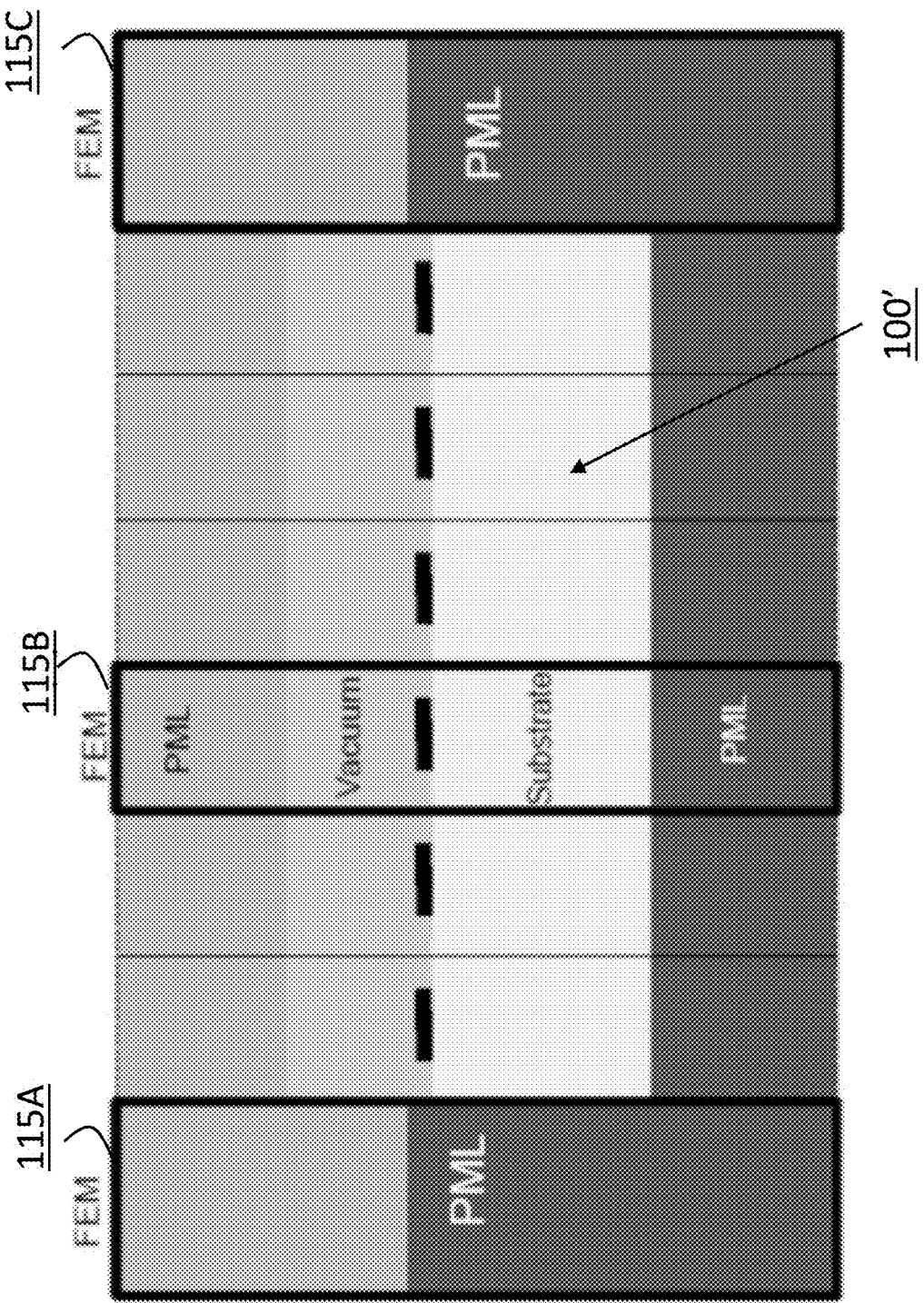
FIG. 1C is a modified illustration of the abstraction of FIG. 1B representing the use of an implementation of a hierarchical cascading finite element analysis method on the surface acoustic wave device of FIG. 1A.

This problem of memory consumption and computation times may be addressed through the use of hierarchical cascading algorithms that take advantage of the periodic structure typical of SAW devices. FIG. 1C is a modified illustration of the abstraction of FIG. 1B representing the use of an implementation of a hierarchical cascading finite element analysis method on the SAW device of FIG. 1A. Rather than modeling the entire SAW device, the SAW device may be partitioned into portions or unit blocks 115B, of which many may be identical. Only unique unit blocks need be modeled or simulated, while identical unit blocks may be excluded from modeling. The sides of the device may be terminated in dedicated PML blocks 115A, 115C for analysis, as external degrees-of-freedom. The device 100' is accordingly analyzed as a hierarchical tree of cascading operations, where adjacent smaller blocks are combined into larger blocks, eventually covering the whole device. In 2D this is drastically more efficient than conventional FEM, and may also be applied in many implementations to 3D SAW simulation and bulk acoustic wave (BAW) devices.

FEM Modeling of Unit Blocks

Figure 2B:
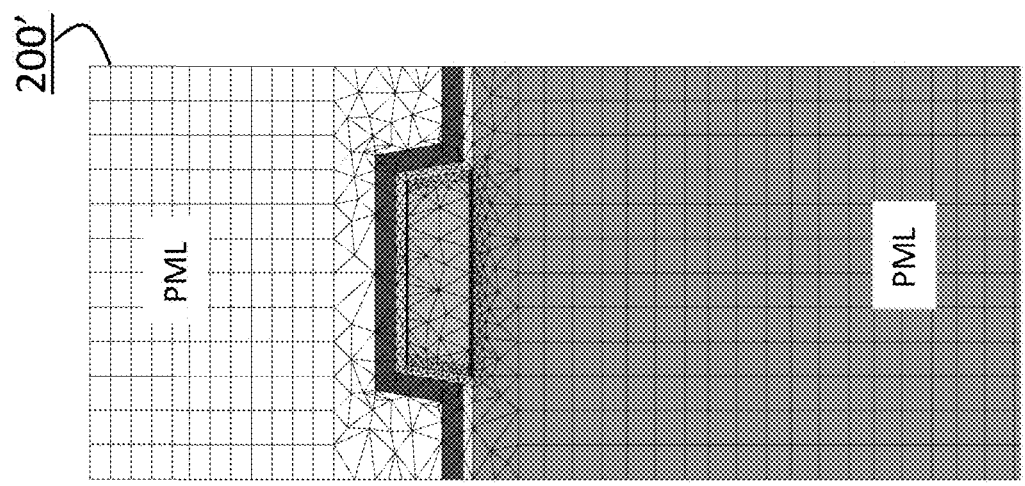
FIGS. 2A and 2B are illustrations of an example of a unit block and a computational mesh of a unit block, for implementations of hierarchical cascading finite element analysis.
Figure 2A:
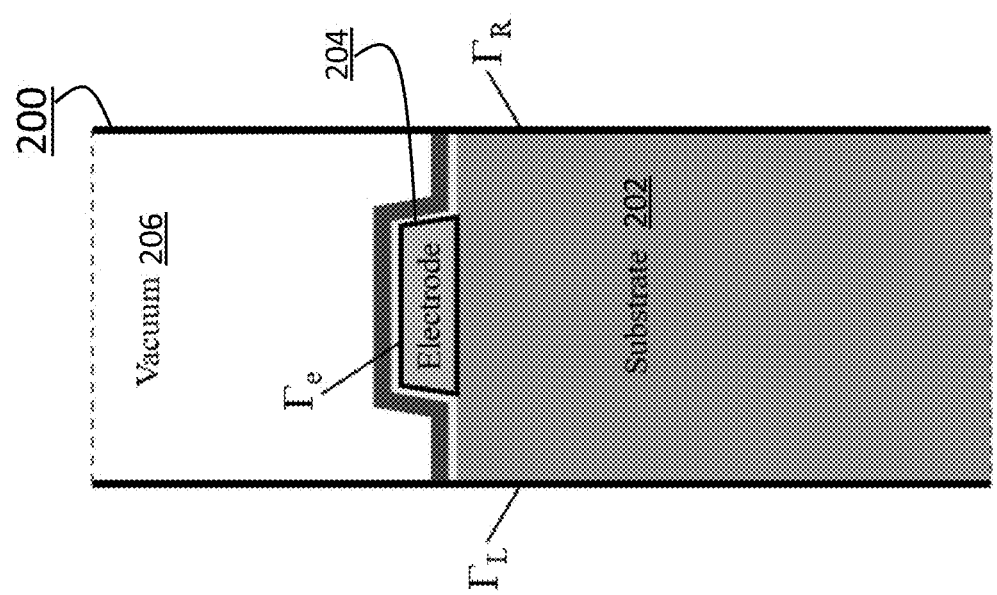

In the hierarchical cascading method, the device geometry is partitioned into a sequence of repeating unit blocks 200 (e.g. similar to unit block 115B discussed above), an example implementation of which is illustrated in FIG. 2A. As shown, a typical unit block 200 may include a rectangular substrate volume 202, an electrode 204, and the vacuum 206 above. The electrode 204 may consist of multiple metals, depending on implementation, and may be covered by a stack of dielectric layers (yellow and red in the illustration of FIGS. 2A and 2B). $\Gamma_L$ and $\Gamma_R$ denote the left and right edges of the unit block 200, respectively, while $\Gamma_e$ is the electrode boundary. The acoustic aperture dimension is into the page. FIG. 2B illustrates an implementation of an FEM mesh 200' of the unit block 200, using triangular and quadrilateral elements. Dense meshing around the electrode may improve the accuracy of simulated surface charge distribution, in some implementations. The top and bottom PML are not shown in full height, and may extend farther in many implementations. Accordingly, the unit blocks 200 are subdivided into finite elements, yielding the computational mesh 200' of the geometry, shown in FIG. 2B.

A. FEM System Equation

Consider a unit block under harmonic excitation at angular frequency $\omega=2\pi f$ Non-hierarchical FEM analysis yields a linear system of equations:

$$[K+i\omega D-\omega^2 M](x)=(F) \quad \text{(eq. 1)}$$

Here, the expression in the brackets is the system matrix, consisting of the stiffness matrix K, damping matrix D, and mass matrix M. They are inherently symmetric. The vector x contains the DOFs of the model: the nodal values of mechanical displacement and electric potential at the nodes. The vector F contains the external sources—the charge density and the boundary stresses.

The degrees-of-freedom and the external sources can be classified into those associated with the left edge (L), the right edge (R), interior (I), and the electric potential connected to an electrode (v). Correspondingly, the system of equations (1) can be reordered as:

$$\begin{bmatrix} A_{LL} & A_{LI} & 0 & A_{LV} \\ A_{IL} & A_{II} & A_{IR} & A_{IV} \\ 0 & A_{RI} & A_{RR} & A_{RV} \\ A_{VL} & A_{VI} & A_{VR} & A_{VV} \end{bmatrix} \begin{pmatrix} X_L \\ X_I \\ X_R \\ v \end{pmatrix} = \begin{pmatrix} \tau_L \\ \tau_S \\ \tau_R \\ -q \end{pmatrix} \quad \text{(Eq. 2)}$$

Here, A is the reordered system matrix. The equations associated with the electric DOF on the electrode have also been included; this can be interpreted as integration over charge density. On the right-hand side, $\tau_L$ and $\tau_R$ are integrals over surface stresses at the left and right edge. These will cancel out in the cascading process. In most use cases, interior stresses $\tau_S=0$. The scalar q denotes the net surface charge at the electrode boundary; the current flowing into the electrode is $I=i\omega Wq$. If the unit block has no electrode, the related components are filled with zeros.

B. Perfectly Matched Layers

Perfectly matched layers (PML) are used to mimic open boundary conditions. An ideal PML absorbs all incident acoustic radiation without reflections. In implementations of hierarchical cascading analysis, each unit block may be conceptualized or modeled as including a bottom PML and a vacuum PML, absorbing energy in the vertical direction. In addition, the dedicated PML blocks at the sides also absorb radiation in the horizontal direction, as shown above in units 115A and 115C of FIG. 1B. Depending on the anisotropy of the substrate, the different directions may require using different PML techniques, with different types coexisting in the corners. In various implementations, one or more of the following techniques may be employed.

1) Convolution Stretched-Coordinate PML:

The C-PML technique is particularly well suited for elastic and piezoelectric problems. Within the PML, the physical coordinates $(x_1, x_3)$ are replaced with complex-valued stretched coordinates of the form:

$$\begin{cases} \tilde{x}_1 = x_1 - i \int \mu_1(x_1)dx_1, \\ \tilde{x}_3 = x_3 - i \int \mu_3(x_3)dx_3. \end{cases} \quad \text{(Eq. 3)}$$

Generally, the stretching factors $\mu_i$ may be complex-valued and frequency-dependent. Stretching is only applied in the direction where absorption is required, in many implementations.

To demonstrate how the C-PML works, consider the impact of a bottom PML on a downward-propagating wave:

$$e^{ik_3 x_3} \to e^{ik_3 x_3} e^{k_3 \int \mu_3(x_3)dx_3} \quad \text{(Eq. 4)}$$

With $\text{Re}(\mu_3)>0$, the propagating wave is effectively converted into a decaying wave, which tends to zero as $x_3 \to -\infty$. Moreover, any residual wave component reflected from the bottom boundary will further decay on its way back upwards to the surface. An imaginary part $\text{Im}(\mu_3)>0$ can be interpreted as geometric scaling; it enhances the decay of surface modes into the PML. However, it also accelerates the oscillation of propagating waves.

In FEM implementation, the coordinate stretching corresponds to the substitution:

$$\frac{\partial}{\partial x_k} \rightarrow \left(\frac{1}{1+i\mu_k}\right)\frac{\partial}{\partial x_k} \qquad \text{(Eq. 5)}$$

in the field equations. It can be implemented directly in element integration routines of the FEM code, or be subsumed in the materials constants.

In theory, the surface impedance of the PML is identical to that of the normal substrate: the layer is perfectly matched. In practical FEM implementation, with the differential equations approximated with discrete equations, the matching is not perfect, especially for waves with a shallow propagation angle. To minimize reflections, the stretching factors and the other properties of the PML must be chosen with great care. A common practice is to choose an absorption profile which vanishes at the interface between the normal substrate and the PML. One such choice is:

$$\mu_i(\xi) = \begin{cases} 0 & \xi < \xi_{min} \\ \sin^2\left(\frac{\pi}{2}\frac{\xi - \xi_{min}}{\xi_{max} - \xi_{min}}\right) & \xi \in [\xi_{min}, \xi_{max}] \end{cases} \qquad \text{(Eq. 6)}$$

Here, $\xi$ denotes the relevant coordinate direction, and $\mu_{i,max}$ is the maximum stretching factor.

The stretching factors can be chosen inversely proportional to frequency. This makes the attenuation rate within the PML independent of the frequency, which is particularly handy in time-domain simulations. However, the frequency-independent stretching factors used in Eqs. (3)-(6) also have a significant advantage: the matrices (K, D, M) in Eq. (1) are frequency-independent and need to be evaluated only once.

Figure 3:
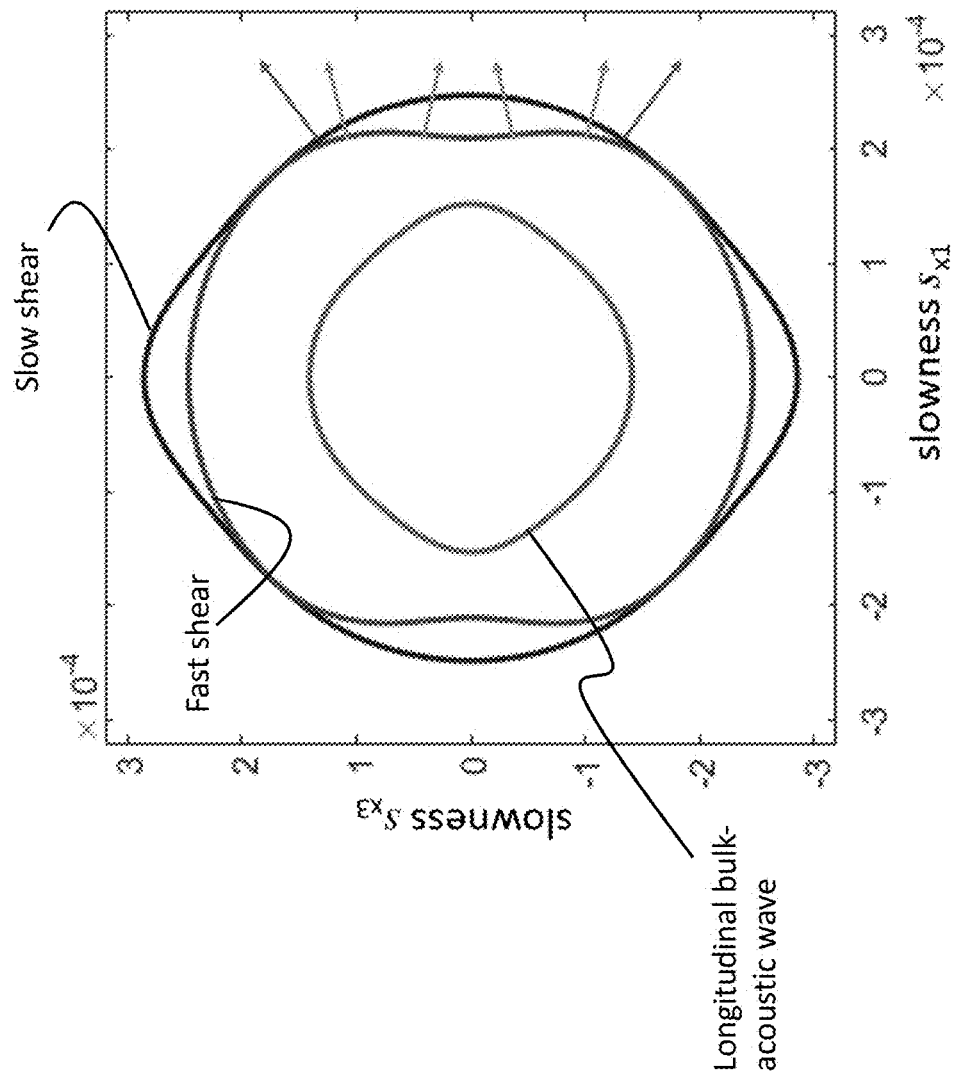
FIG. 3 is a graph of slowness curves for bulk acoustic waves in an implementation of a bulk acoustic wave device.

In many implementations, the C-PML technique cannot absorb waves with negative phase velocity in the direction of the PML. This situation may occur in substrates with unfavorable shape of the slowness curves. As an example, FIG. 3 is a graph of slowness curves for bulk acoustic waves (BAWs) in an implementation of a 128° YX-cut LiNbO$_3$ device. Blue, red, and magenta curves correspond to slow shear, fast shear, and longitudinal bulk-acoustic waves, respectively. For $s_{x1} \in (2.104 \ldots 2.151) \cdot 10^{-4}$, the fast shear wave has concave slowness curvature. The arrows indicate the direction of power flow, parallel to the outward normal of the slowness curves.

Consider bulk waves propagating in a semi-infinite substrate $x_3 \leq 0$. The physically relevant solutions are those with zero or negative power flow along $x_3$. On the concave region of the slowness curves, these include fast shear waves with upward phase velocity ($s_{x3} > 0$). Substitution of such modes in Eq. (4) results in exponential amplification, not in decay. In practical implementation, the problem manifests as instability of the PML.

2) Multi-Axial Perfectly Matched Layer:

In some implementations, multi-axial PML may be used to improve instability issues in the simulation. In contrast to C-PML, where coordinate stretching is applied only in the direction of the layer, in M-PML coordinate stretching is applied also parallel to the layer interface. The ratio of tangential and normal stretching factors is kept constant; for example, in a bottom PML, $\mu_1(x_3) = r\mu_3(x_3) \neq 0$. The proportionality constant r may be chosen based on the anisotropy of the substrate and the direction of the PML. For $r \rightarrow 0$, the M-PML reduces to a conventional C-PML.

A sufficiently large stretching ratio r stabilizes the M-PML. However-contrary to its name—the layer is not perfectly matched to the substrate. In many implementations, the M-PML technique is more prone to reflections than the C-PML technique, especially for shallow propagation angles. The computational mesh, the r-parameter, and the attenuation profile $\mu(\xi)$ should be optimized simultaneously, carefully considering the trade-off between the absorbing efficiency of the M-PML and the strength of reflections.

3) Hierarchically Cascaded PML:

In some implementations of analysis of BAW devices, long damping layers implemented with the hierarchical cascading method can be used effectively as side PMLs. With longer layers, lower attenuation rates can be used, reducing matching problems and, as coordinate stretching is not used, there are no stability problems. However, the idea also works with coordinate stretching. Hierarchical cascading makes long C-PMLs or M-PMLs with piecewise flat absorption profile computationally attractive.

4) Anisotropic Perfectly Matched Layer for Vacuum:

Neither C-PML nor M-PML techniques work in vacuum. Instead, in some implementations, a strong artificial anisotropy is introduced to the dielectric permittivity of vacuum $\epsilon_0$ as follows:

$$\epsilon_0 \rightarrow \epsilon_0 \begin{bmatrix} \mu_{vacuum}(x_3) & 0 \\ 0 & \mu_{vacuum}^{-1}(x_3) \end{bmatrix} \qquad \text{(Eq. 7)}$$

Here, the anisotropy profile $\mu_{vacuum}(x_3)$ is a parameter. To avoid numerical problems, it starts from $\mu_{vacuum} = 1$, but increases deeper into the PML, in such manner that the normal component of the relative permittivity becomes much less than unity. As a result, analysis at vacuum is both extremely efficient and easy to implement.

Hierarchical Cascading Method

A. From FEM Model to B-Matrix

In absence of interior stresses ($\tau_S = 0$), the internal DOFs $x_I$ can be eliminated from the matrix of Eq. (2) by forming the Schur complement of $A_{II}$. This results in a new system of equations, where the only variables are the electric potential and the DOFs associated with the nodes at the left- and right-hand side interfaces:

$$\begin{bmatrix} B_{11} & B_{12} & B_{13} \\ B_{21} & B_{22} & B_{23} \\ B_{31} & B_{32} & B_{33} \end{bmatrix} \begin{pmatrix} X_L \\ X_R \\ v \end{pmatrix} = \begin{pmatrix} \tau_L \\ \tau_R \\ -q \end{pmatrix} \qquad \text{(Eq. 8)}$$

The 3×3 matrix in the above equation may be referred to in some implementations as the "B-matrix". The FEM system matrix A in Eq. (2) is symmetric and very sparse. The B-matrix is also symmetric but full. It shares some similarity with the admittance matrices in network theory.

B. Electric Connectivity

An extended B-matrix is needed to cover all electric ports of a SAW device and to connect each electrode to the correct potential. Let the vector $V \equiv (v_1 \ldots v_K)^T$ contain all the K potentials present in the device, and collect the corresponding T net surface charges to $Q \equiv (q_1 \ldots q_K)^T$. Consider unit block A. Connectivity vector $\Gamma^A$ is defined as the K×1 vector:

$$\Gamma_j^A = \begin{cases} 1 & \text{if electrode in } A \text{ is connected to } v_j, \\ 0 & \text{otherwise.} \end{cases} \quad \text{(Eq. 9)}$$

This vector may be used to compute an extended B-matrix, defined as:

$$\begin{bmatrix} B_{11} & B_{12} & B_{13}\Gamma^T \\ B_{21} & B_{22} & B_{23}\Gamma^T \\ \Gamma B_{31} & \Gamma B_{32} & \Gamma B_{33}\Gamma^T \end{bmatrix} \begin{pmatrix} X_L \\ X_R \\ V \end{pmatrix} = \begin{pmatrix} \tau_L \\ \tau_R \\ -Q \end{pmatrix} \quad \text{(Eq. 10)}$$

The extended B-matrix enables correct handing of N-port devices in the cascading process. It remains symmetric. The effect of electrode resistivity can also be subsumed to the extended B-matrix.

C. Cascading Two B-Matrices

Let A and B be two adjacent blocks, with compatible meshes at the shared interface A∩B. The respective B-matrices satisfy:

$$\begin{bmatrix} B_{11}^A & B_{12}^A & B_{13}^A \\ B_{21}^A & B_{22}^A & B_{23}^A \\ B_{31}^A & B_{32}^A & B_{33}^A \end{bmatrix} \begin{pmatrix} X_L \\ X_R^A \\ V \end{pmatrix} = \begin{pmatrix} \tau_L \\ \tau_R^A \\ -Q^A \end{pmatrix} \quad \text{(Eq. 11)}$$

$$\begin{bmatrix} B_{11}^B & B_{12}^B & B_{13}^B \\ B_{21}^B & B_{22}^B & B_{23}^B \\ B_{31}^B & B_{32}^B & B_{33}^B \end{bmatrix} \begin{pmatrix} X_L^B \\ X_R \\ V \end{pmatrix} = \begin{pmatrix} \tau_L^B \\ \tau_R \\ -Q^B \end{pmatrix} \quad \text{(Eq. 12)}$$

The mechanical stresses, and normal electric displacement should be continuous across the shared edge: $X_R^A = X_L^B \equiv X_C$, and $\tau_R^A = -\tau_L^B$. Consequently, $X_C$ can be eliminated via:

$$X_C = -[B_{22}^A + B_{11}^B]^{-1} [B_{21}^A \quad B_{12}^B \quad B_{23}^A + B_{13}^B] \begin{pmatrix} X_L \\ X_R \\ V \end{pmatrix} \quad \text{(Eq. 13)}$$

Back substitution of Eq. (13) into Eq. (11) and Eq. (12) yields:

$$\begin{bmatrix} B_{11}^{AB} & B_{12}^{AB} & B_{13}^{AB} \\ B_{21}^{AB} & B_{22}^{AB} & B_{23}^{AB} \\ B_{31}^{AB} & B_{32}^{AB} & B_{33}^{AB} \end{bmatrix} \begin{pmatrix} X_L \\ X_R \\ V \end{pmatrix} = \begin{pmatrix} \tau_L \\ \tau_R \\ -Q^{AB} \end{pmatrix} \quad \text{(Eq. 14)}$$

where $Q^{AB} \equiv Q^A + Q^B$. The cascaded B-matrix in Eq. (14) fully describes the response of the combined block. It is also symmetric.

The size of a B-matrix depends only on the number of DOFs at the edges and on the number of electric connections. If all mesh edges are compatible, the cascaded B-matrix has the same size as the original B-matrices. Moreover, cascaded B-matrices can be further cascaded to describe longer structures. Hence, in many implementations of hierarchical cascading, a B-matrix can describe SAW structures from a single unit block to aggregated sequences of arbitrarily many electrodes, providing easy and efficient scalability.

D. Hierarchical Cascading

In implementations of hierarchical cascading, the SAW structure may be described as a series of cascading operations. At the lowest level the device is decomposed into unit blocks, which typically contain only one electrode or none at all. The device structure is analyzed automatically to identify repeated patterns at different length scales; the aim is to use as few cascading operations as possible. This is somewhat analogous to text compression algorithms.

Figure 4A:
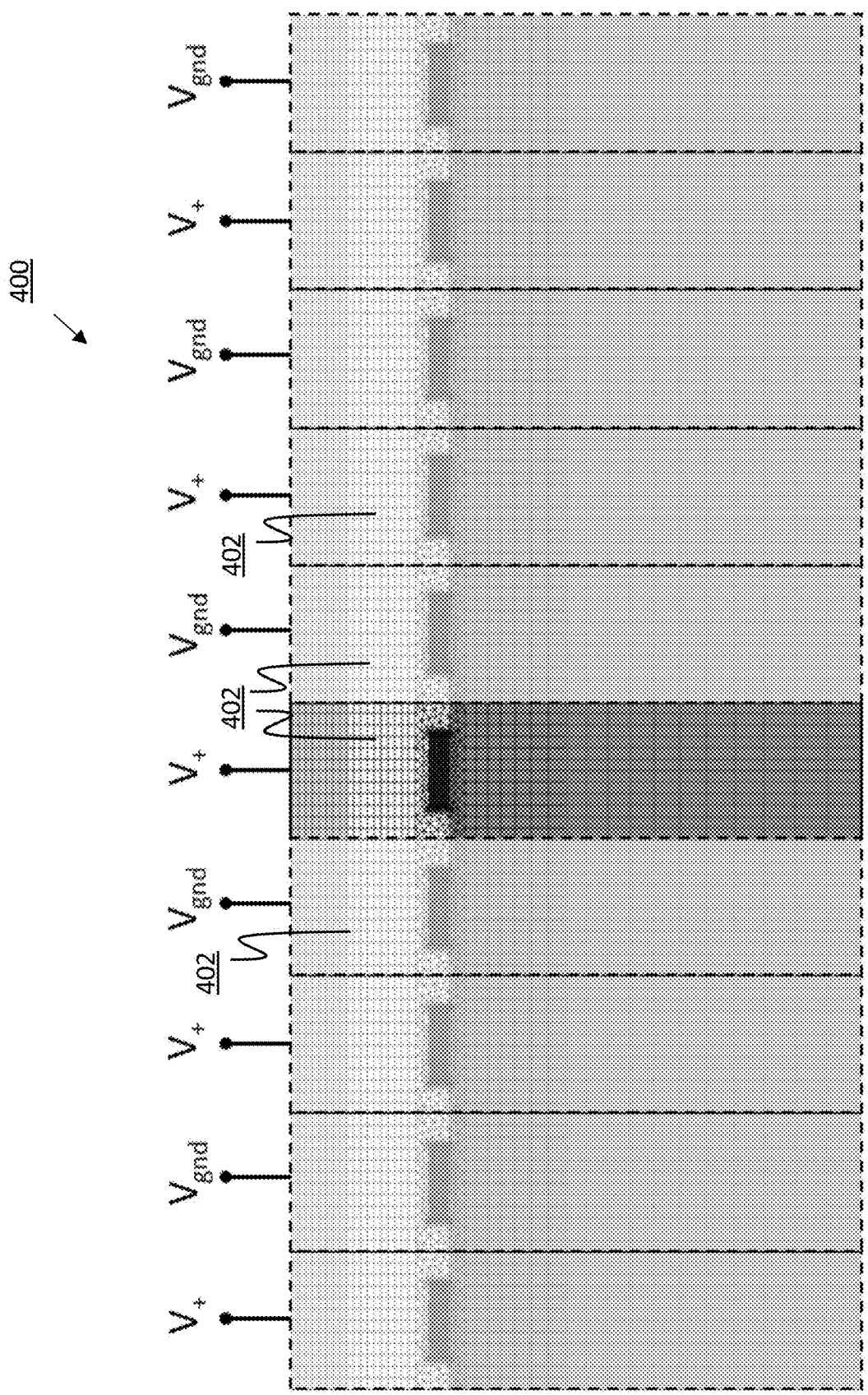
FIG. 4A is an illustration of a series of computational meshes of unit blocks, for implementations of hierarchical cascading finite element analysis.

FIG. 4A is an illustration of a series 400 of computational meshes of unit blocks 402, for implementations of hierarchical cascading finite element analysis. As discussed above, a SAW device may be conceptually partitioned into a series of unit blocks 402. The unit blocks may be substantially identical, in many implementations, or may be grouped into identical subsets (e.g. unit blocks having a ground connection to an electrode, unit blocks having a positive voltage connection to an electrode, etc.).

Figure 4B:
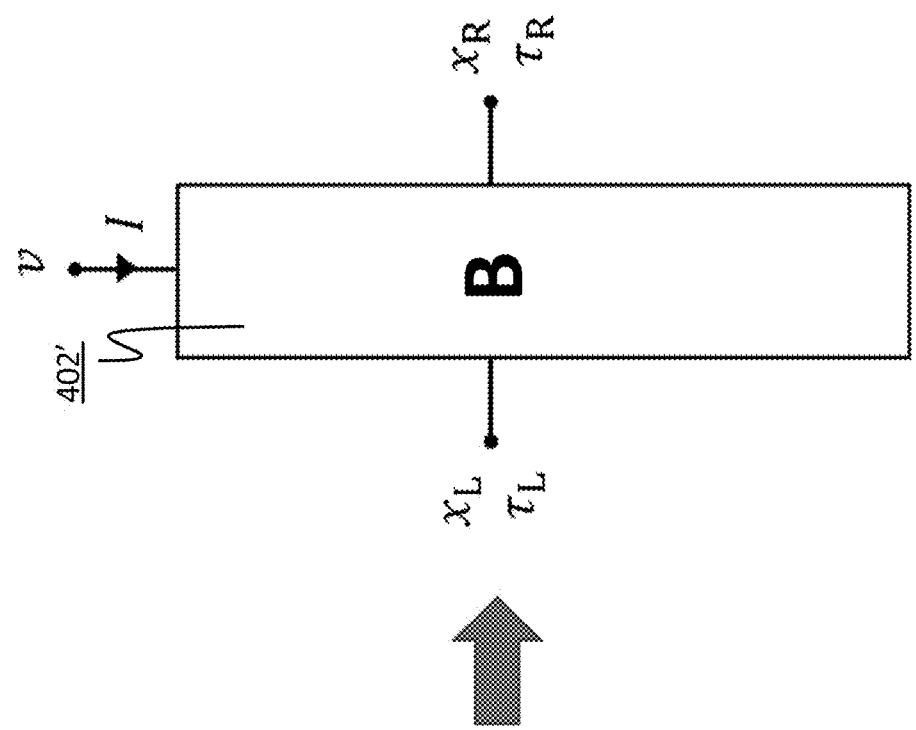
FIG. 4B is an illustration of conversion of a computational mesh of a unit block into a multi-port model, according to some implementations.
Figure 4B:
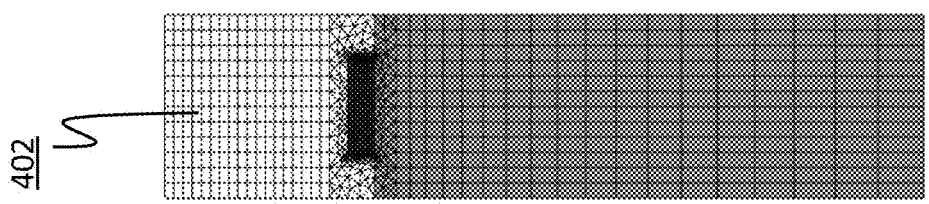

As discussed above, each unit block may be modeled as a single multi-port device, with each port having many degrees-of-freedom. FIG. 4B is an illustration of conversion of a computational mesh of a unit block 402 into a multi-port model 402', according to some implementations. As shown, the resulting model of the unit block may be represented by a B-matrix as discussed above.

Figure 4C:
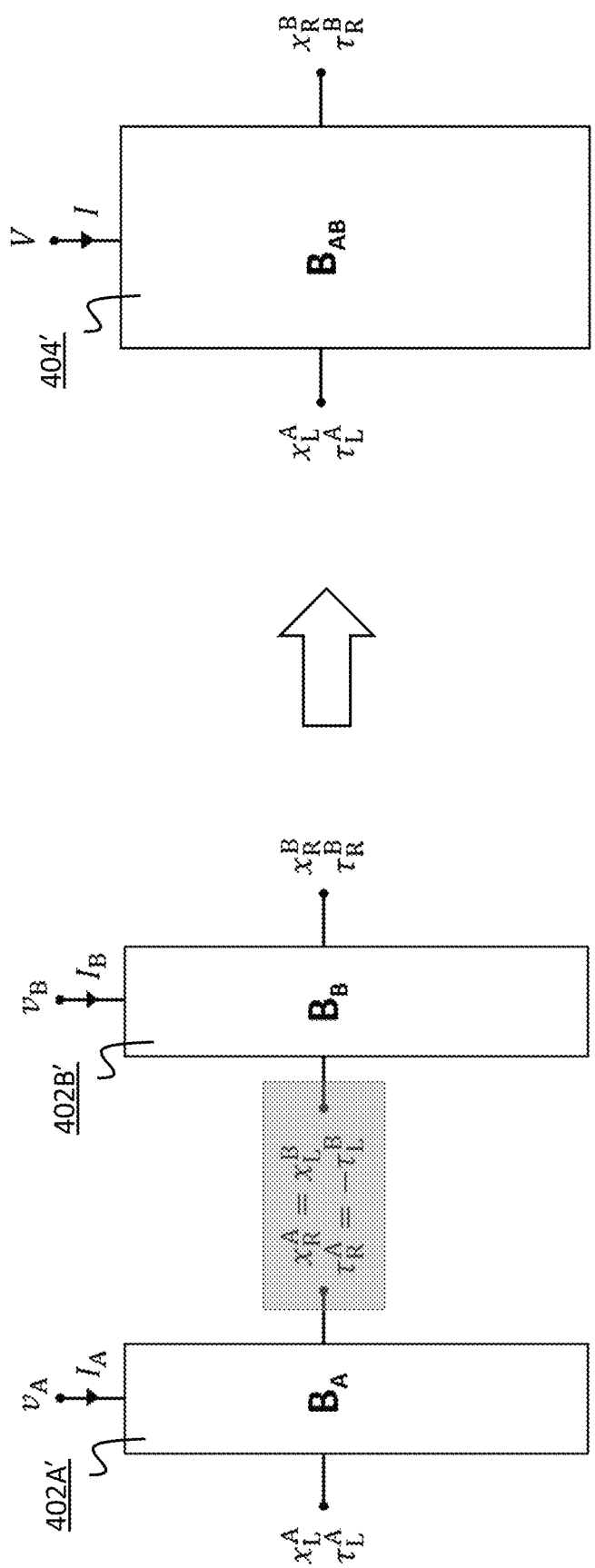
FIG. 4C is an illustration of cascading multi-port models to model a combination of unit blocks, according to some implementations.

FIG. 4C is an illustration of cascading multi-port models 402' to model a combination of unit blocks, according to some implementations. As shown, adjacent multi-port models 402A', 402B' may be combined (e.g. via Eqs. 11-14) to generate a combined unit block model 404', which may similarly comprise a single multi-port device model with each port having degrees-of-freedom representing the combined contribution of each unit block 402' contained within the combination. The combined B-matrix $B_{AB}$ of the combined unit block model 404' is of the same size as matrices $B_A$ and $B_B$.

Figure 4D:
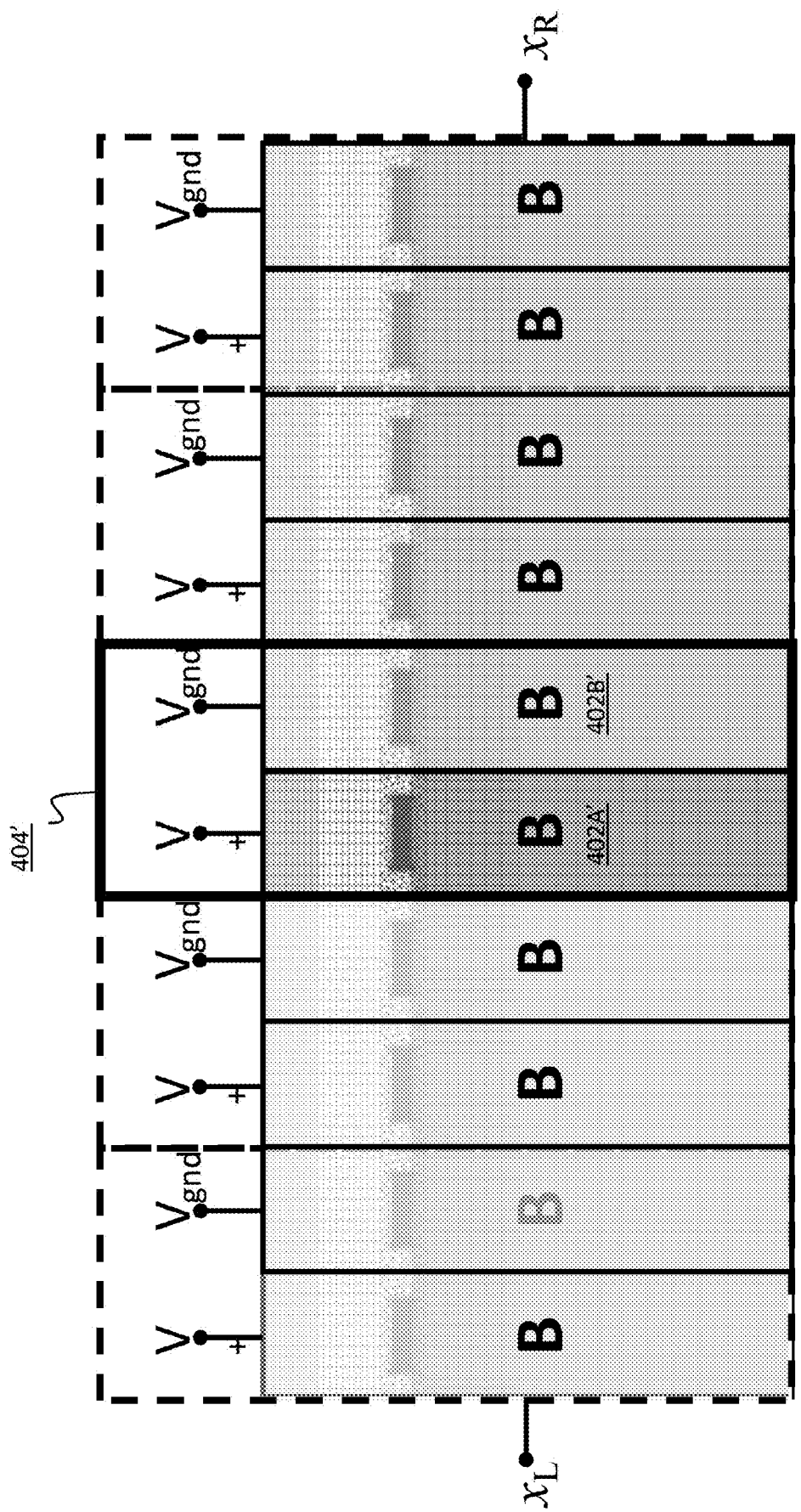
FIG. 4D is an illustration of the series of computational meshes of unit blocks of FIG. 4A, after a first iteration of a hierarchical cascading process, according to some implementations.
Figure 4E:
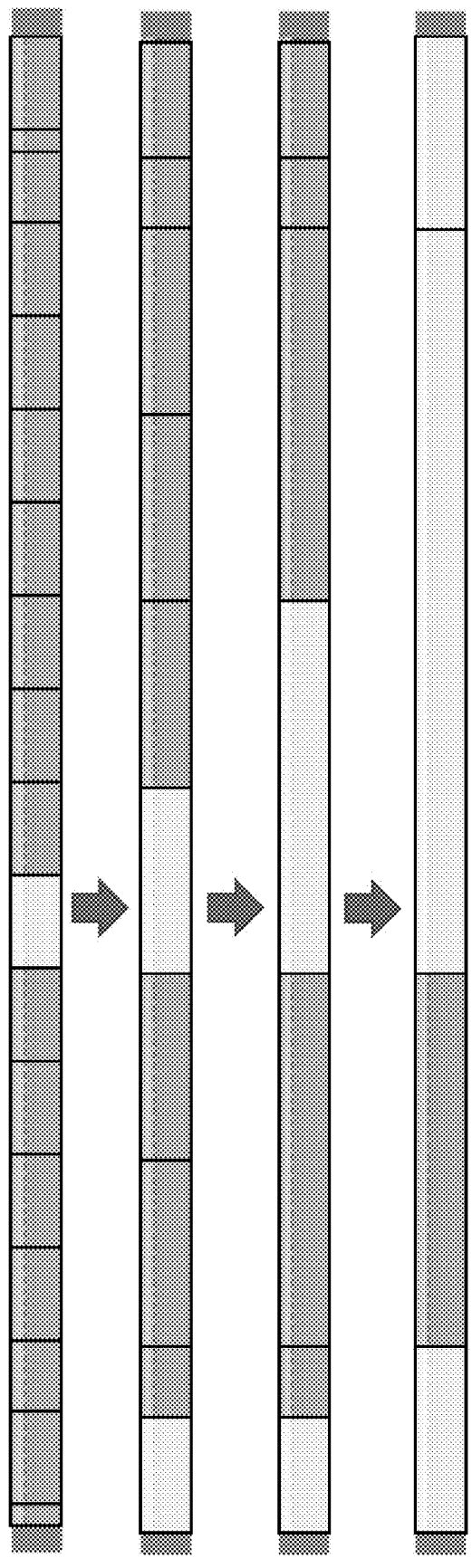
FIGS. 4E and 4F are illustrations of an iterative hierarchical cascading process through multiple iterations, according to some implementations.
Figure 4F:
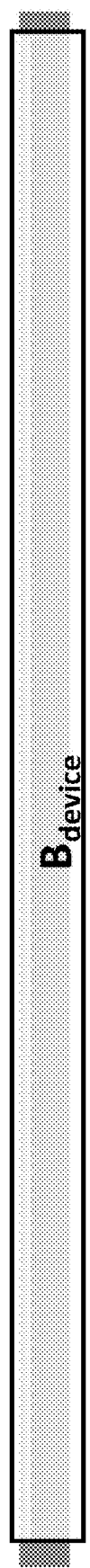

Similarly, FIG. 4D is an illustration of the series of computational meshes of unit blocks of FIG. 4A, after a first iteration of a hierarchical cascading process, according to some implementations. As shown, individual unit block models 402' may be combined into a series of combined unit block models 404', each represented with a dashed outline. As shown, a single iteration has occurred, creating a second level of the hierarchy. The process may be repeated to further combine already-combined models into larger and larger blocks, until the entire device may be modeled as a B-matrix, as shown in the illustrations of FIGS. 4E and 4F. For example, having modeled two adjacent combination unit blocks, each having a two unit block width, the combination unit blocks may be further combined to generate a single B-matrix model of all four individual unit blocks, with the process further iterating until a single B-matrix model represents the entire device. The full solution may be recovered from the single B-matrix model with inverse cascading, as discussed herein, to recover the original degrees-of-freedom.

Figure 4G:
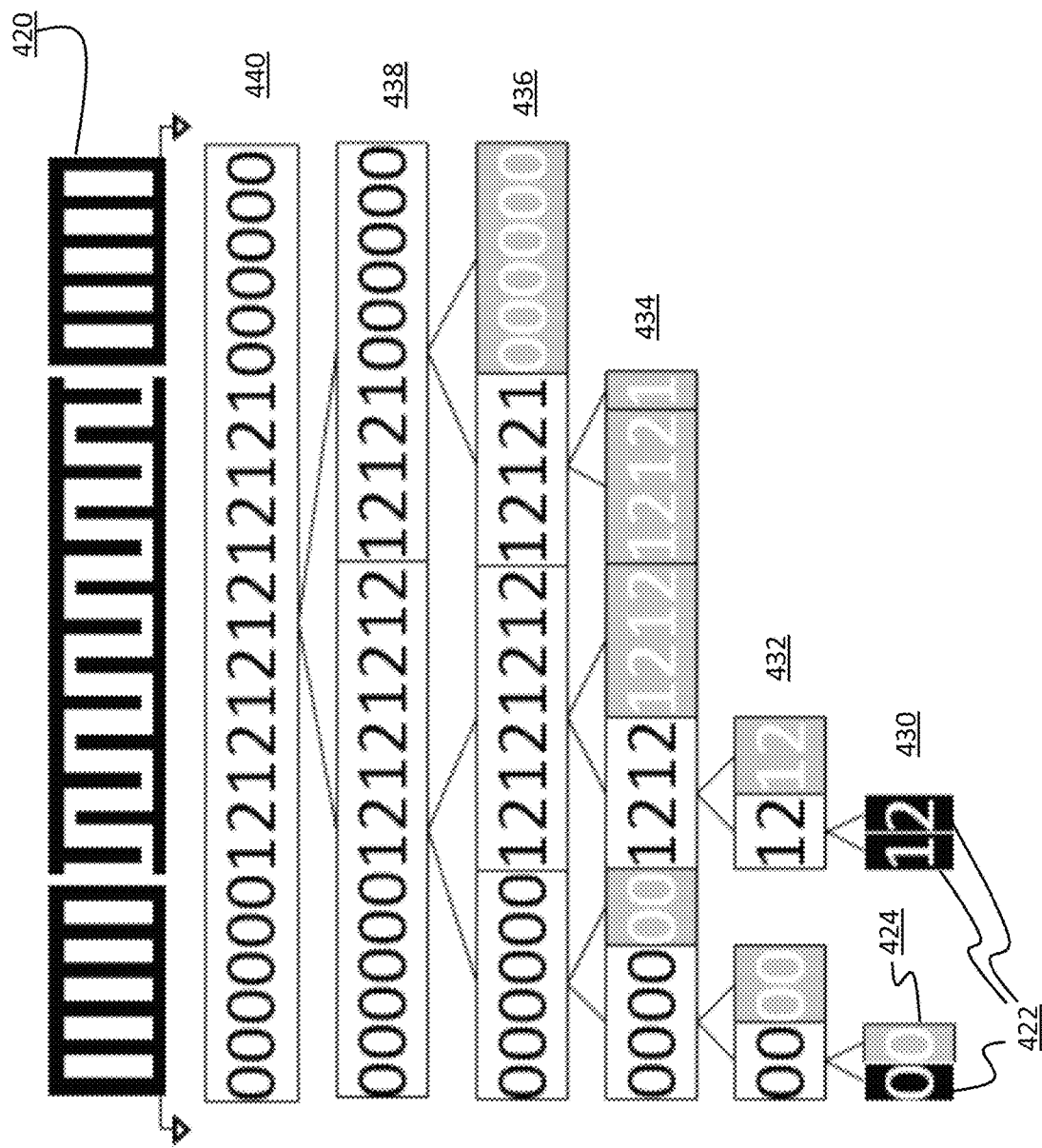
FIG. 4G is an illustration of a hierarchical cascading tree for a synchronous resonator, according to some implementations.

Furthermore, not every block needs to be explicitly analyzed and its matrix calculated. In practice, many blocks or sets of adjacent blocks may be repeated throughout the device or may be identical to other blocks within the device. Accordingly, once modeled, the B-matrix for the block or combination may be re-used for other identical blocks or combinations within the device. An illustrated example of how the hierarchical cascading works is shown in the illustration of FIG. 4G. A resonator 420 may comprise a series of identical electrodes with different connectivity, represented by the values 0 (grounded), 1 (upper bus), and 2 (lower bus). Each node in the tree represents a B-matrix for the electrode sequence in the box. Initially at step 430, the system is too complex to be modeled directly. Instead, through cascading of steps 430-440, the unit blocks may be divided down into identical sets of representative blocks which may then be analyzed, and then reconstructed to generate the complete model.

For example, at step 430 unique unit blocks 422 (e.g. 0, 1, and 2, shown in black) may be analyzed. Block 424 may be skipped, as it is identical to a block that has already been analyzed. The combination of each pair of unit blocks may be used to generate the four unit blocks at step 432. The blocks shown in white (e.g. 00 and 12) may be evaluated as a combination of the two already analyzed unit blocks that make them up. The blocks shown in grey are identical to the blocks in white, and need not be analyzed. Similarly, at steps 434, 436, and 438, larger blocks may be constructed as a combination of previously evaluated blocks and/or may be identical to already constructed blocks. As a result, via the ten cascading operations shown, the model of the device 420 may be decomposed into a structure that may be more efficiently analyzed, and cascaded to generate the complete model.

E. Solving the Cascaded System

The outcome of the cascading process is a single B-matrix, which describes the whole structure. Finally, the structure is terminated with side PMLs and solved for external electric excitation. Assuming that the side PMLs absorb all incident acoustic radiation, zero displacement can be assumed at the exterior side. For the PML at the left side (LPML):

$$[B_{22}^{LPML}](x_R^{PML}) = (\tau^{PML}) \qquad (Eq.\ 15)$$

and likewise for the PML at the right side (RPML). Cascading the device B-matrix with the PML blocks yields:

$$B_{11}^{tot} = B_{11} + B_{22}^{LPML} \qquad (Eq.\ 16)$$

and $$B_{22}^{tot} = B_{22} + B_{11}^{RPML} \qquad (Eq.\ 17)$$

Let there be $N_{port}$ electric voltages, and let e be the $1 \times N_{port}$ matrix with all elements being unity. The desired voltage excitations are stated, relative to an unknown reference potential $V_{ref}$, as follows:

$$V = \Delta V + e^T V_{ref} \qquad (Eq.\ 18)$$

Charge neutrality is enforced by requiring that the sum over all surface charges vanishes, i.e., eQ=0. After these substitutions, the final system of equations takes the form:

$$\begin{bmatrix} B_{11}^{tot} & B_{12} & B_{13}e^T \\ B_{21} & B_{22}^{tot} & B_{23}e^T \\ eB_{31} & eB_{32} & eB_{33}e^T \end{bmatrix} \begin{pmatrix} X_L \\ X_R \\ V_{ref} \end{pmatrix} = -\begin{pmatrix} B_{13} \\ B_{23} \\ eB_{33} \end{pmatrix} \qquad (Eq.\ 19)$$

The net electric currents can be directly evaluated as $$I = -i\omega W(B_{31}X_L + B_{32}X_R + B_{33}V) \qquad (Eq.\ 20)$$

The other observables of interest can be calculated as a post-processing step.

F. Postprocessing

If desired, all internal degrees-of-freedom can be retrieved by inverting the cascading process shown in FIG. 4G. In such implementations, starting from the known top-level solution $(x_L, x_R, V)$, the hierarchical cascading tree may be walked downwards to resolve variables at block interfaces. The B-matrices present at each level of the hierarchy are split into their respective constituents, using Eq. (13) above to solve the variables at the shared edge. The process is continued until the variables at all block edges have been retrieved. The internal degrees-of-freedom $x_I$ in each copy of the unit block can be retrieved from Eq. (2).

The knowledge of the full FEM solution enables evaluation and visualization of various observables-of-interest. These observables may include current distribution in the electrodes, mechanical displacement distribution, and power flow distribution. In Q-factor analysis, the stored electroacoustic energy, resistive losses, and losses due to acoustic radiation can be evaluated independently.

Figures 6A, 6B:
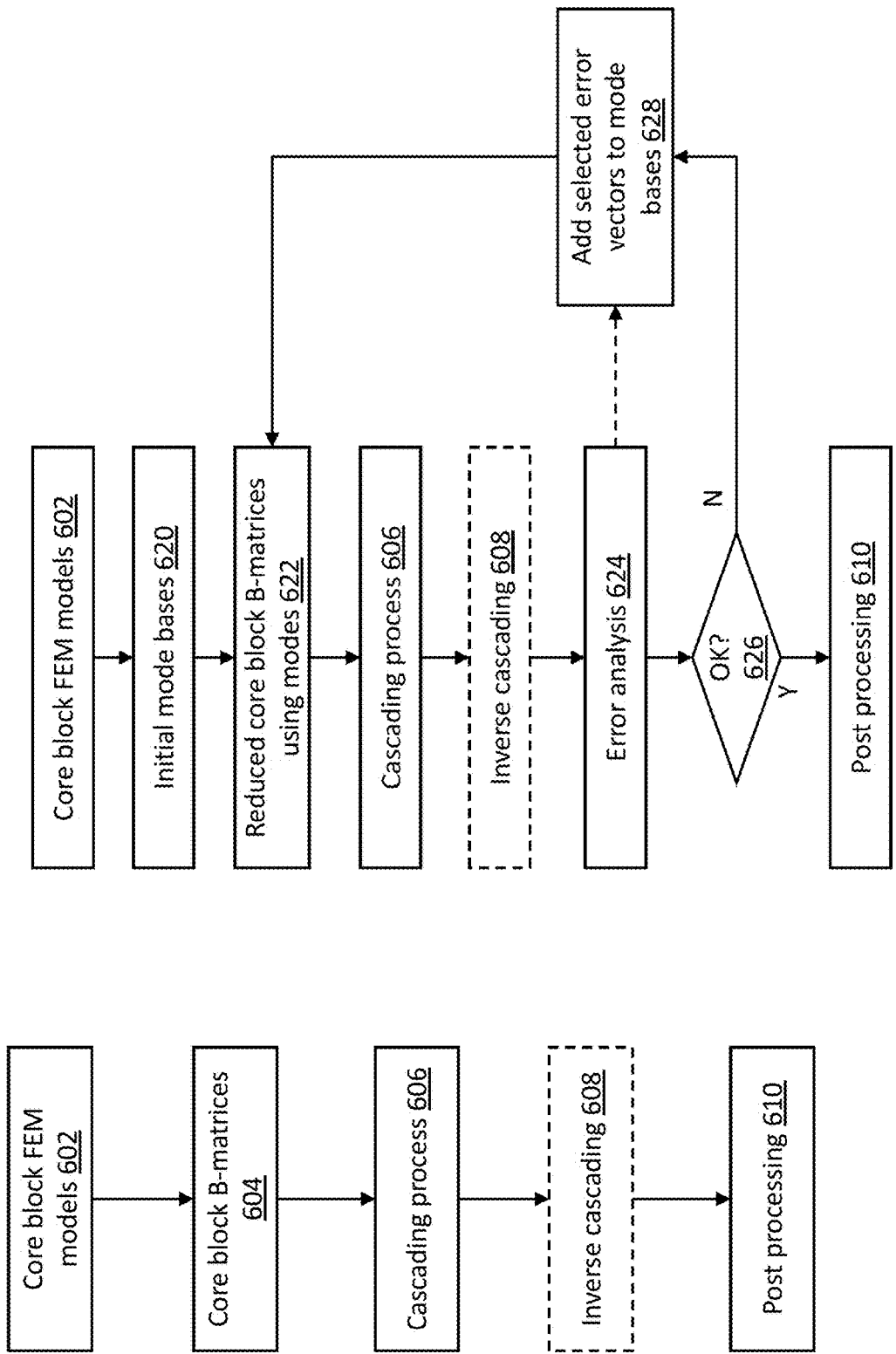
FIG. 6A is a flow chart of an implementation of a method for hierarchical cascading analysis.
FIG. 6B is a flow chart of an implementation of a method for iterative hierarchical cascading analysis.

Referring briefly ahead to FIG. 6A, a flow chart of an implementation of the above process is illustrated. The process may sometimes be referred to as direct hierarchical cascading, in contradistinction to iterative hierarchical cascading, discussed below in connection with FIG. 6B. Still referring to FIG. 6A and in brief overview, at step 602, core block FEM models may be identified, and at step 604, B-matrices for the core block models may be evaluated or solved. At step 606, a cascading process may be performed to successfully evaluate larger unit blocks based on combinations of analyzed unit blocks. In some implementations or optionally, an inverse cascading process may be utilized at step 608 (shown in dashed line) to identify all internal degrees-of-freedom. Finally, post processing steps may be applied to finalize the model at step 610.

Still referring to FIG. 6A and in more detail, at step 602, a physical model of the AW structure is defined and partitioned into a plurality of original unit blocks. Each original unit block may comprise zero or one electrode in many implementations. At least one core block is identified within the plurality of original unit blocks, and an FEM analysis is performed to compute the electrical characteristics of the core block(s) and produce a sparse, symmetric FEM system matrix, A, for each core block. In some implementations, the FEM is used to compute the DOFs in the form of acoustic and electric fields inside of the core block(s) excited by the electric potential (if any) on the electrodes (if any) within the core block(s) and the forces and electric potentials occurring at the boundaries of the core block(s).

At step 604, the internal DOFs are removed from each of the meshed core block(s) to produce reduced system B-matrices or dense, symmetric "boundary matrices" representing reduced core blocks. Computing the response of each of the core blocks using the FEM thus may include generating an A-matrix having left-side boundary DOFs, right-side boundary DOFs, and internal DOFs, and removing the internal DOFs from the A-matrix to generate a B-matrix comprising only the left-side boundary DOFs, the right-side boundary DOFs, and the electric potential and net surface charge on the electrode(s) (if any), as discussed above. In addition, in some implementations, electrode resistive losses can be subsumed into the B-matrices. In some implementations, specified electrical connections may be employed to form extended B-matrices that define one or more types of original unit blocks from each core-block B-matrix (e.g. 0, 1, 2 as discussed above in connection with FIG. 4). In some implementations, the number of original unit blocks may be reduced down to a minimum number of types (each type with its own unique voltage), so that the unit blocks can be more efficiently cascaded down to a single block.

After the types of original unit blocks have been determined from both the core block(s) and the electrical connections of the original unit blocks that the respective core block(s) physically represent, a hierarchical cascading pattern is determined from the nature and pattern of the original unit blocks at step 606, and adjacent sets of unit blocks originating from the unit blocks (e.g. blocks 0, 1, 2 of FIG. 4G, as shown) are either combined or transferred from their current hierarchical level to the next in accordance with the determined hierarchical cascading pattern until a single block subsuming all of the original unit blocks is realized. A set of adjacent blocks may, e.g., include only original unit blocks, at least one original unit block and at least one cascaded unit block, or only cascaded unit blocks.

In particular, unique sets of adjacent original unit blocks and/or cascaded unit blocks, together with any "orphaned" original unit blocks or cascaded unit blocks, are identified at the current hierarchical level, and the responses (electrical characteristics) of each adjacent block set at this current hierarchical level are cascaded (combined) to determine the responses of larger blocks at the next hierarchical level and the "orphaned" blocks at this hierarchical level are simply transferred to the next hierarchical level.

In some implementations, cascading the responses of each set of adjacent unit blocks (either original or previously cascaded) may include combining the extended and/or cascaded B-matrices of the respective set of adjacent unit blocks into a single new combined C-matrix having left-side boundary DOFs corresponding to the left-side boundary DOFs of a left one of the respective set of adjacent unit blocks, right-side boundary DOFs corresponding to a right one of the respective set of adjacent unit blocks, and internal DOFs (center DOFs in the case where the set of adjacent unit blocks only include two unit blocks) corresponding to shared edges or a shared edge between adjacent ones of the unit blocks; and removing the internal DOFs from the single new combined C-matrix to create a new cascaded B-matrix comprising only left-side boundary DOFs and right-side boundary DOFs. In some implementations, once the characteristics of an original unit block or cascaded unit block are computed, such computed original unit blocks or cascaded unit blocks can be conveniently referenced during subsequent cascading operations at the same hierarchical level or at the next hierarchical level. The cascading process may repeat iteratively for each subsequent hierarchical level until the FEM hierarchical cascading process has resulted in a single block subsuming all of the original unit blocks.

Iterative Hierarchical Cascading

While hierarchical cascading is highly efficient in 2D simulations, the benefits of the approach may be somewhat reduced in 3D, in some implementations. Consider three different simulation types: 2D finite, 3D periodic, and 3D finite structure simulation. As a metric of the memory consumption, consider the amount of RAM required to store a single B-matrix in a high-accuracy "stress test" case. Likewise, as a gauge of the simulation speed, consider the computational complexity of cascading two B-matrices.

Figure 5A:
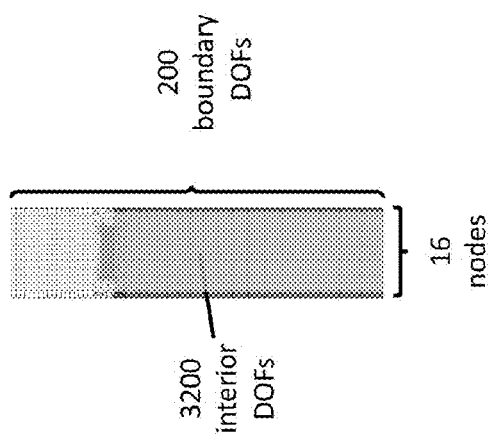
FIGS. 5A-5C are illustrations of two and three dimensional models of an electrode array, according to some implementations.
Figure 5C:
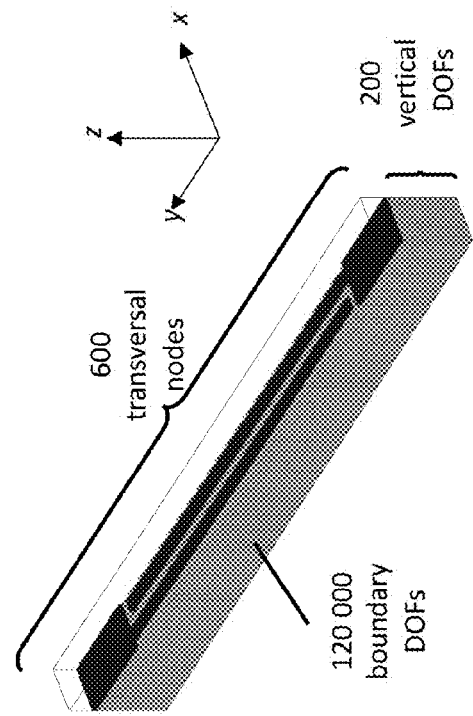
Figure 5B:
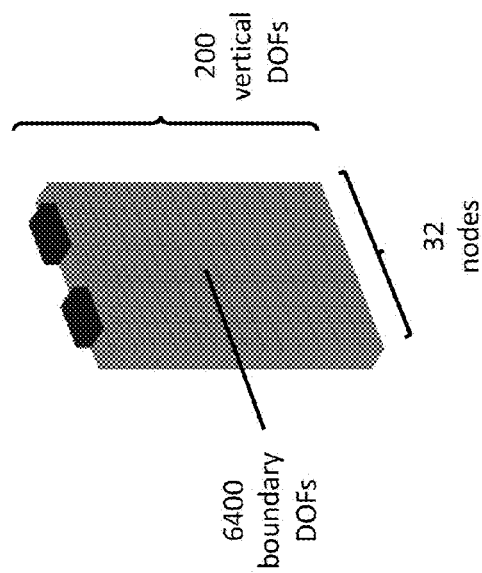

An example implementation of a unit cell is depicted in FIGS. 5A-5C, including an electrode pair, a gap, busbars, the underlying piezoelectric substrate mesh, the vacuum above, and side PMLs (not shown). FIG. 5A illustrates the unit cell in a 2D finite mode, with 16 nodes and 200 boundary degrees-of-freedom, resulting in 3200 interior degrees-of-freedom. FIG. 5B illustrates the unit cell in a 3D periodic mode, with 32 nodes and 200 vertical degrees-of-freedom, resulting in 6400 boundary degrees-of-freedom. In periodic simulation implementations, periodic boundary conditions are applied along the x-direction. Hierarchical cascading can be applied by splitting the unit cell into small unit blocks along the aperture direction. FIG. 5C illustrates the unit cell in a 3D finite mode, with 200 degrees-of-freedom allocated along the horizontal direction (z), 32 nodes in the longitudinal direction (x), and 600 nodes in the aperture direction (y). This results in 120,000 boundary degrees-of-freedom, as shown. In finite 3D device analysis, cascading would be applied in the x-direction to build longer sequences of unit cells.

As shown, the number of degrees-of-freedom increases substantially with each additional dimension or expansion of the model. With the number of DOFs per face denoted as N, each B-matrix contains ~$4N^2$ complex-valued floating point numbers. The complexity of cascading is $O(N^3)$. Table I lists these numbers for the different analysis types:

| Analysis | DOFs/side | RAM | Complexity | Time |
| --- | --- | --- | --- | --- |
| 2D finite | 200 | 4.8 MB | $8 \cdot 10^6$ | 10 ms |
| 3D periodic | 6400 | 5 GB | $3 \cdot 10^{11}$ | 5 min |
| 3D finite | 120000 | 2 TB | $2 \cdot 10^{15}$ | 25 days |

A 2D simulation can be run in a few seconds per frequency point and can be run on a very modest hardware. A 3D periodic analysis takes a few hours and requires a heavy desktop with 32-64 GB of RAM. By the same scaling, a 3D finite-structure simulation would require years of computation and several TB of RAM. FEM is particularly computationally demanding, because calculating frequency responses and other parameters with a high accuracy requires analyzing several nodes per wavelength, frequently 10, 20, or 30 or more nodes.

A. Modal B-Matrix

The high number of DOFs in FEM is required to suppress numerical dispersion. Basically, this reflects that the FEM shape functions are not very efficient in describing propagating waves. Assume that the solution field at the boundaries can be more compactly approximated as a sum of $N \ll N_{DOF}$ modes $u_i$:

$$X = u_1 y_1 + \ldots + u_N y_N = [U](y) \qquad (\text{Eq. 21})$$

This can be substituted into Eq. (8). To balance the number of equations with the number of effective DOFs, the stresses are multiplied with $U^T$; this corresponds to change of base functions in FEM in Galerkin formalism.

$$\begin{bmatrix} U^T B_{11} U & U^T B_{12} U & U^T B_{13} \\ U^T B_{21} U & U^T B_{22} U & U^T B_{23} \\ B_{31} U & B_{32} U & B_{33} \end{bmatrix} \begin{pmatrix} y_L \\ y_R \\ v \end{pmatrix} = - \begin{pmatrix} U^T \tau_L \\ U^T \tau_R \\ -q \end{pmatrix} \qquad (\text{Eq. 22})$$

The quantity in brackets is the modal B-matrix B(U). The hierarchical cascading using modal B-matrices proceeds exactly in the same as with normal B-matrices. It provides an approximate solution to the simulation problem within the functions which can be expressed using Eq. (21), but with complexity $O(N^3) \ll O(N_{DOF}^3)$.

B. Iterative Base Extension

To find bases without knowing the solution, in some implementations, an iterative cascading algorithm may be used. This expands on the implementation illustrated in FIG. 6A, or direct hierarchical cascading, by iteratively refining guesses for initial core blocks and modes while progressively reducing error rates until achieving a final model. A flow chart of an implementation of a method for iterative hierarchical cascading is illustrated in FIG. 6B. As shown, at step 602, core block FEM models are identified, and at step 620, an initial guess for the suitable modes is generated, for example based on 2D periodic solution.

Using the approximate base, the core B-matrices are generated at step 622, similar to step 604 discussed above. At steps 606 and 608, the solution within the approximate base is calculated via the cascading process discussed above, and inverse cascading is applied, if desired, to generate a final approximate solution expressed in terms of the original DOFs.

At step 624, a local error at each unit block boundary is estimated and compared to a threshold at step 626. In some implementations, the error may be measured in terms of stress discontinuities across unit blocks, or a difference of displacement to that imposed by approximate boundary stresses. The error vectors across the device form a linear space, which is partially independent of the original modal base. Selected linearly independent components of that error space are included in the modal base of Eq. (21) at step 628, and the process is repeated. The iteration is continued until sufficient accuracy is reached at step 626 (e.g. accuracy greater than a threshold level, or error rates less than a threshold). As each iteration increases the dimension of the mode base, eventually the process will cover all the original DOFs. Post processing may then be applied at step 610, as discussed above.

While individual iterations are much faster than cascading using all DOFs, the overall efficiency of the algorithm depends on how rapidly it converges-on how successfully relevant modes can be added to complement the mode base.

EXAMPLES

The hierarchical cascading algorithm was implemented on the commercial Matlab platform, using a custom mesh generation algorithm and an FEM engine. The mesh generation is based on a modified version of Chew' second Delaunay refinement algorithm; in particular, mechanisms were introduced to relax mesh fidelity criteria within thin films. A triangulated mesh is used in the vicinity of the electrodes: an increased element density around the electrode corners is highly beneficial for modeling the charge density distribution, resulting in improved accuracy of the simulated capacitance. Further away from the surface the mesh is regular and consists of quadrilateral elements, as shown in FIG. 2B. The simulation speeds are reported for an elderly desktop PC (CPU i7-2600k, 3.4 GHz, 32 GB RAM), with computation distributed over four parallel threads.

A. 2D Synchronous Resonator on 42° YX-Cut LiTaO$_3$

The first example is a synchronous resonator on a 42° YX-cut LiTaO$_3$ substrate, with the following geometry: pitch (electrode-to-electrode distance) p=1.0 μm, metallization ratio a/p=0.55, aluminum thickness $h_{Al}$=160 nm, and acoustic aperture W=40.0 μm. There are $N_t$=121 electrodes in the IDT and $N_g$=40 electrodes in each reflector. The Kovacs materials constants were used for the substrate. Material losses in the electrodes and the substrate were modeled as viscous damping by adding an imaginary component to the elastic constants. Resistive losses were estimated using bulk conductivity $\sigma_{Al}$=3.7·107 S/m.

The substrate was modeled with the C-PML technique, covering H=1.0 μm of normal substrate and $H_{PML}$=2.0 μm of PML with 20 finite elements. Only a single unit period and the two PML blocks need to be simulated with FEM. The models with quadratic and cubic elements used 6636 and 14 625 DOFs, respectively. Note that in conventional FEM this would mean a device model with 2.7 and 5.9 million variables, respectively. The achieved simulation speeds were 2.4 and 9.6 seconds per frequency point, respectively. The results were essentially identical; in what follows, those from the quadratic model are shown.

To validate the accuracy of the simulation, the same structure was also simulated using a FEM/BEM-based commercial simulation tool FEMSAW2. The simulated admittance curves are compared in the graph at the left of FIG. 7A, with (in this case, the real portion of the admittance (Re(Y)) and the absolute admittance (|Y|) computed over the frequency range 1500 MHz-1800 MHz) of the FEM hierarchical cascading technique and the reference FEM/BEM. The small differences are mostly due to differences in the modeling of resistivity.

Figure 7A:
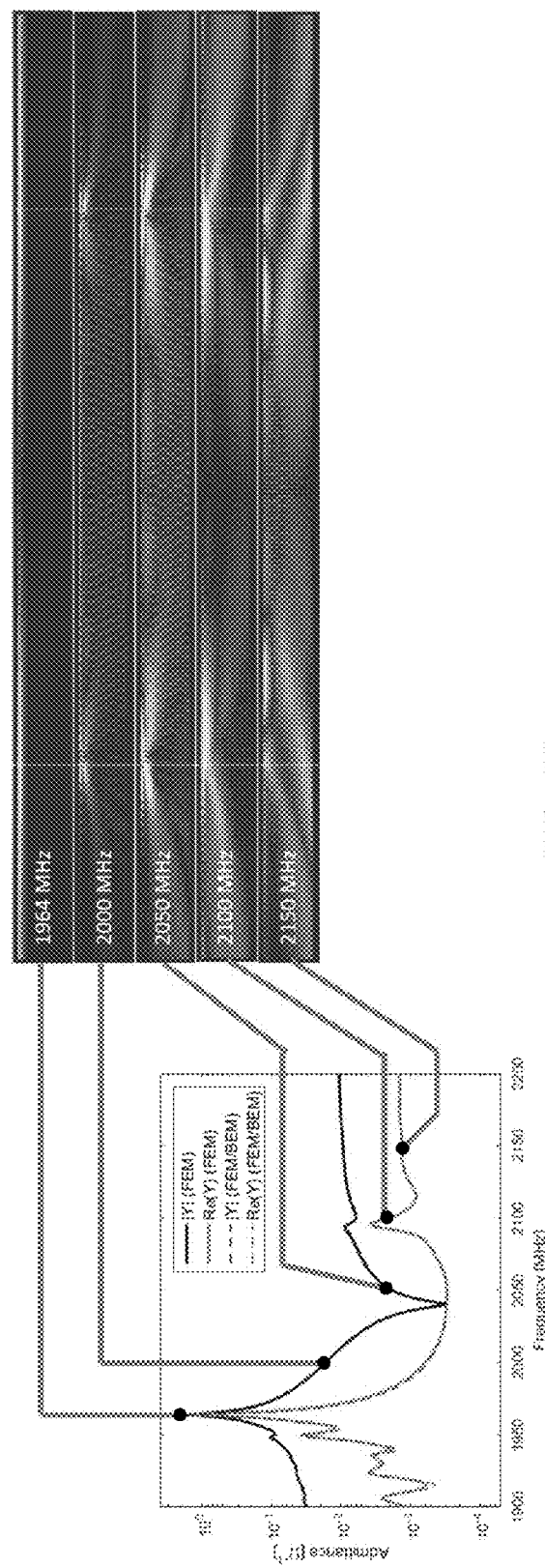
FIG. 7A illustrates graphs of admittance over frequency for a measured example surface acoustic wave resonator and a simulated surface acoustic wave resonator, according to some implementations.
Figure 7B:
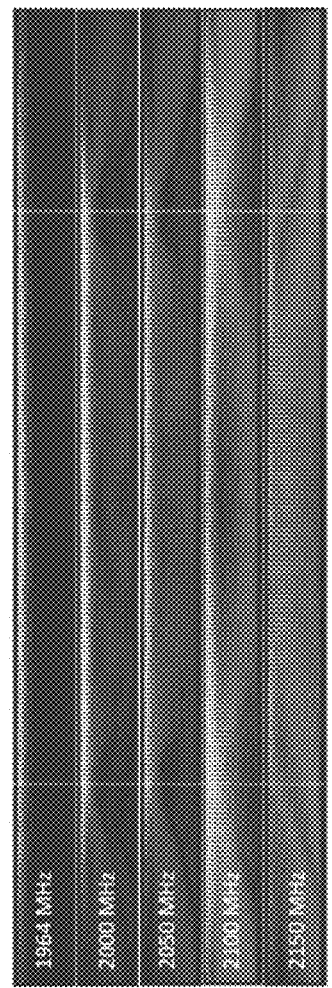
FIG. 7B illustrates shear-horizontal polarization at selected frequencies for the example surface acoustic wave resonator of FIG. 7A, according to some implementations.

FIG. 7A also illustrates a visualization of the absolute power flow $|\vec{P}|$ at the selected frequencies shown, evaluated using inverse cascading. The white vertical lines mark the boundary between reflectors and transducer. Different color scale is used at different frequencies. Losses due to acoustic radiation are manifested as power flow towards the bottom or through the reflectors. The resonance frequency (1964 MHz) shows strong confinement of acoustic energy both laterally and in depth direction. In the middle of the stopband (2000-2100 MHz), the most prominent feature is localized bulk-wave radiation from the transition region between the IDT and the reflectors. Strong synchronous bulk-wave excitation can be seen at 2150 MHz. Similarly, FIG. 7B illustrates a visualization of the dominant shear-horizontal component of the mechanical displacement at the selected frequencies.

B. TC-SAW Simulation on 128° YX-Cut LiNbO$_3$

The second example demonstrates an advanced SAW structure, a temperature compensated SAW (TCSAW) resonator on 128° YX-cut LiNbO$_3$, with 170 nm thick copper electrodes and a 630 nm thick SiO2 overcoating. The resonator is synchronous, with pitch p=1 μm, metallization ratio is 0.5, $N_t$=121, $N_g$=40, and W=49.2 μm. Resistive losses were estimated using conductivity $\sigma_{Cu}$=5.8·107 S/m.

As discussed above, for this substrate the C-PML is unstable in vertical direction. To demonstrate the impact of the instability, simulations were carried out using three different substrate mesh configurations, see Table II:

| Configuration | H | $H_{PML}$ | Elements | $\mu_{z,max}$ | r |
|---|---|---|---|---|---|
| C-PML1 | 1.0p | 2.0p | 20 | 80 + 80i | 0 |
| C-PML2 | 4.0p | 2.0p | 40 | 80 + 80i | 0 |
| M-PML | 4.0p | 36.0p | 40 | 10 + 10i | 0.02 |

Configuration C-PML1 uses the same C-PML mesh as discussed above. C-PML2 is otherwise the identical but with more normal substrate between the surface and the PML; the rationale is to direct radiation from the unstable bottom PML to the stable lateral PMLs. The third one uses an optimized M-PML. The stretching ratio r≈0.02 seems sufficient to completely stabilize the M-PML. However, to suppress reflections the stretching profile $\mu_3(x_3)$ must be made more gradual than in the C-PML approach. Consequently, a thicker absorbing layer must be used to reach a comparable level of absorption. The side PMLs are implemented using the C-PML approach. All PMLs use the attenuation profile from Eq. (6).

Figure 8:
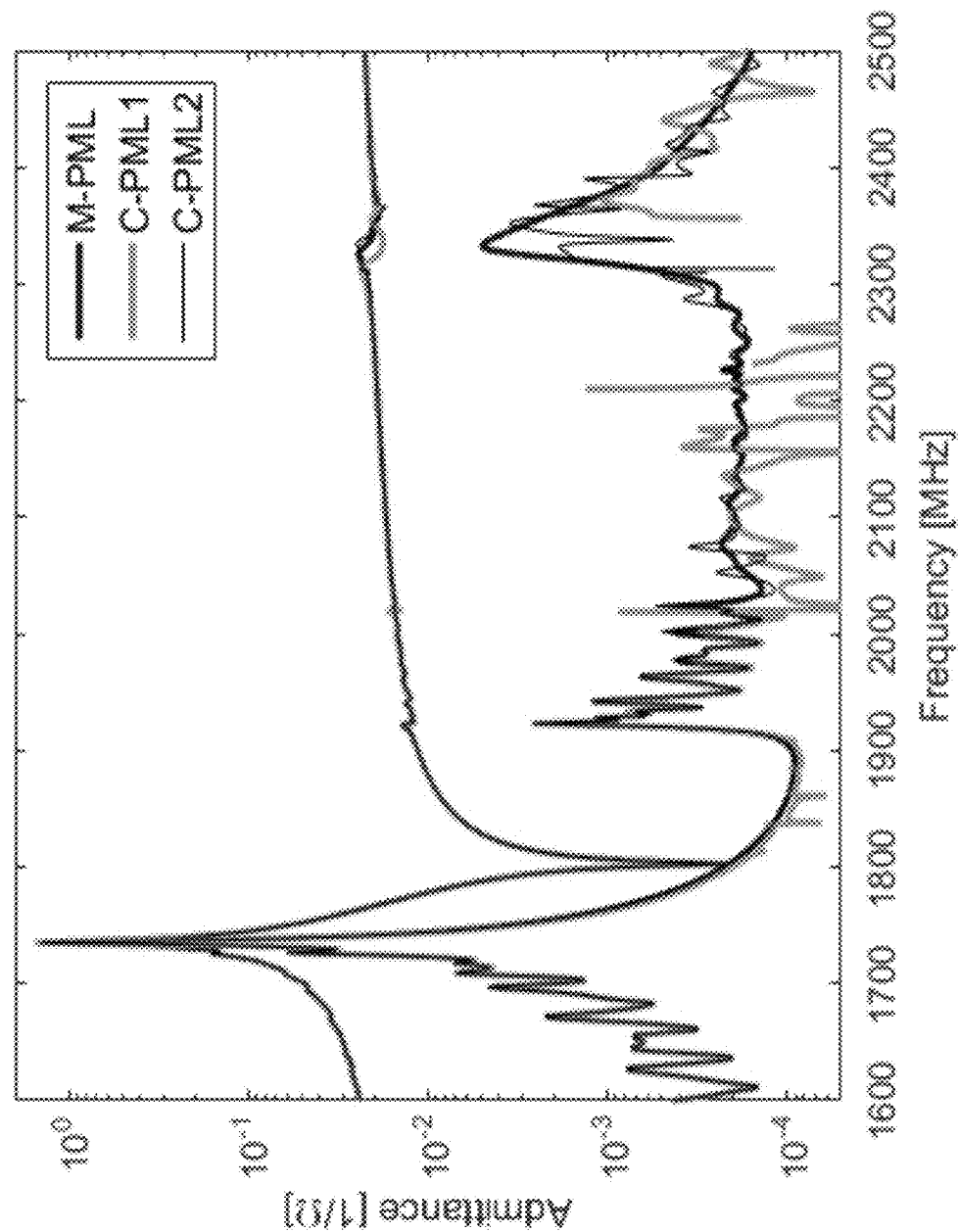
FIG. 8 illustrates graphs of admittance over frequency for a simulated temperature compensated surface acoustic wave resonator at different boundary conditions, according to some implementations.

The FEM model for a single unit block had 9317-13383 degrees-of-freedom, depending on the mesh configuration; the achieved simulation speeds respectively varied between 5.1-13.6 seconds per frequency point. The simulated electric responses are compared in the admittance over frequency graphs of FIG. 8. At the main resonance and within the stopband, 1740-1920 MHz, the results are almost identical. The M-PML configuration appears stable and produces physically sound results at all frequencies. In contrast, C-PML1 is distinctively unstable for frequencies above 2000 MHz. C-PML2 performs better than C-PML1. This is due to better geometric isolation in C-PML2: with more distance between the surface and the bottom PML, most shear waves reach the stable side PMLs without entering the unstable bottom PML. Nevertheless, C-PML2 also shows signs of instability at 2300-2400 MHz. At these frequencies, synchronous excitation from the IDT coincides with the non-convex portion of the slowness curves ($s_x^{-1}=2fp$).

Figure 9:
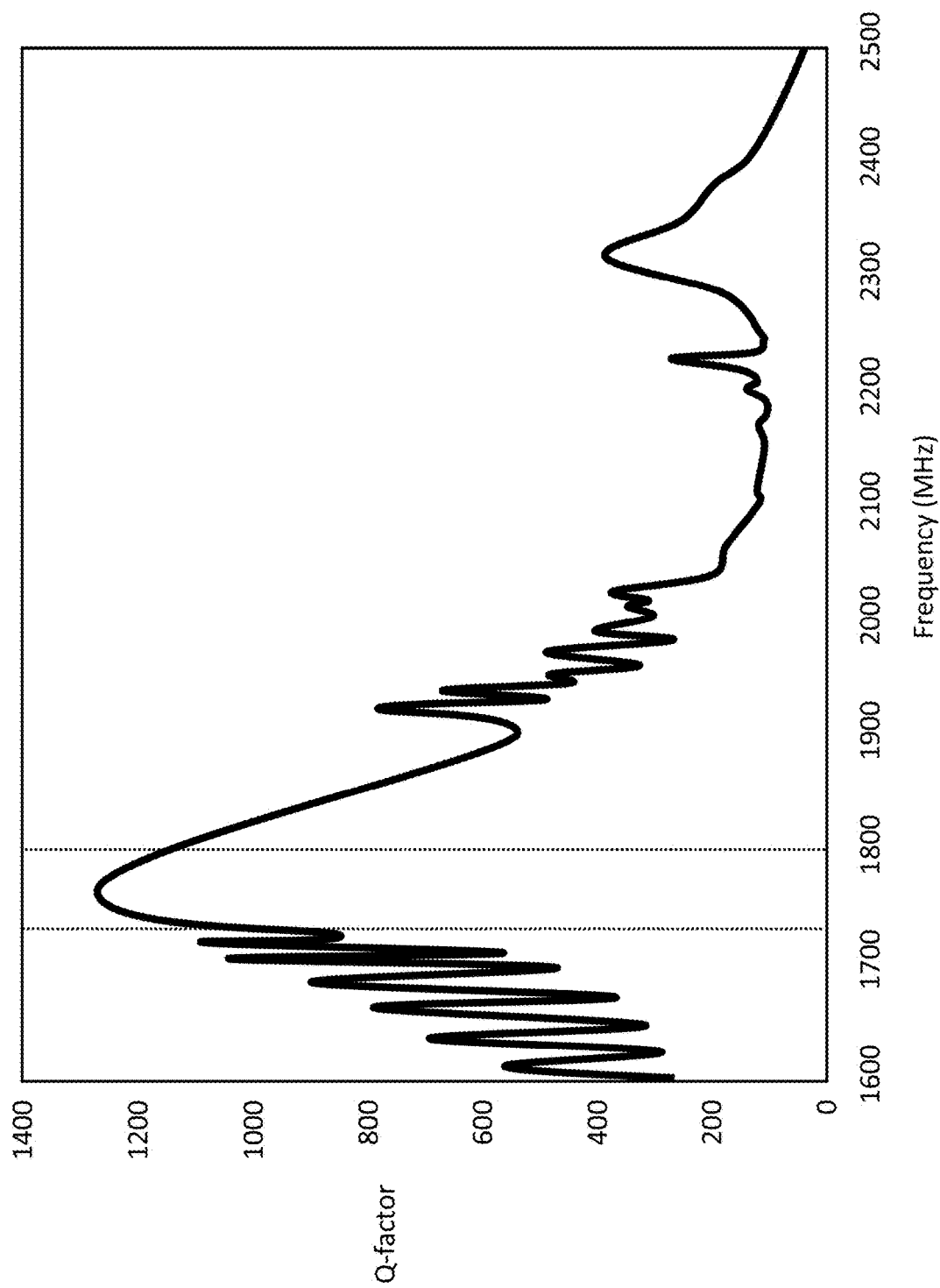
FIG. 9 is a graph of Q-factor over frequency for a simulated temperature compensated surface acoustic wave resonator, according to some implementations.

FIG. 9 shows the Q-factor simulated in the M-PML configuration. The Q-factor remains high from the resonance to the antiresonance (shown in dashed vertical lines). The pronounced radiation losses above the stopband, in the range 1920-2030 MHz, arise due to SAWs escaping through the reflectors. Above 2050 MHz, BAW excitation contributes significantly to losses.

C. 3D Periodic Analysis on 42° YX-Cut LiTaO$_3$

Figure 10:
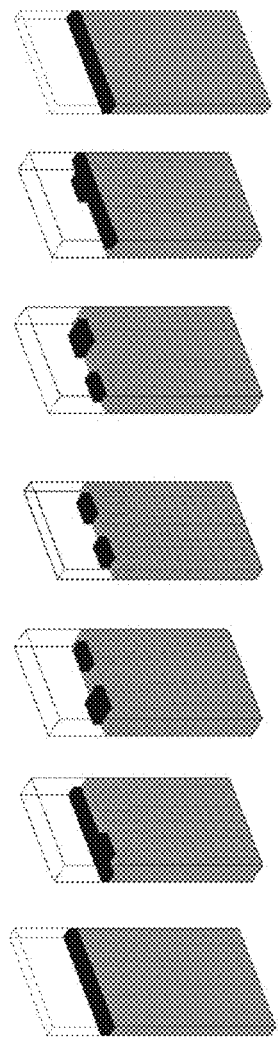
FIG. 10 is an illustration of a decomposition of an array into a plurality of unique unit blocks, according to some implementations.

As an example of 3D periodic analysis with hierarchical cascading, we simulate the harmonic admittance of an electrode array on 42° YX-cut LiTaO$_3$, including transversal effects due to finite aperture. The dimensions of the array are the same as discussed above: p=1.0 μm, $h_{Al}$=160 nm, and W=40.0 μm. The unit cell is similar to the cell displayed in FIG. 5 (without side PMLs). For cascading, the unit cell can be decomposed into the unique unit blocks shown in FIG. 10. The use of the different unit blocks in the mesh is summarized in Table III:

| Mode Base | Location | Occurrence | DOFs | Active DOFs |
|---|---|---|---|---|
| 1 | IDT | 129 | 4638 | 720 |
| 2 | Gap | 1 | 4575 | 280 |
| 3 | Busbar/PML | 129 | 4680 | 630 |
| 4 | Gap | 1 | 4575 | 279 |
| 5 | Busbar/PML | 129 | 4680 | 606 |

In the above table, occurrence represents the number of block-block interfaces using the base; and active DOFs represent the number of modes after 120 iterations at 1990 MHz.

As shown, the unit may be deconstructed into five unique unit blocks, consisting of (from left to right in FIG. 10): left busbar & PML block, left busbar-side gap block, left IDT-side gap block, IDT block, right IDT-side gap block, right busbar-side gap block, and right busbar & PML block. For simplicity, transition blocks have been preferred over discontinuities across unit block interfaces.

Figure 11:
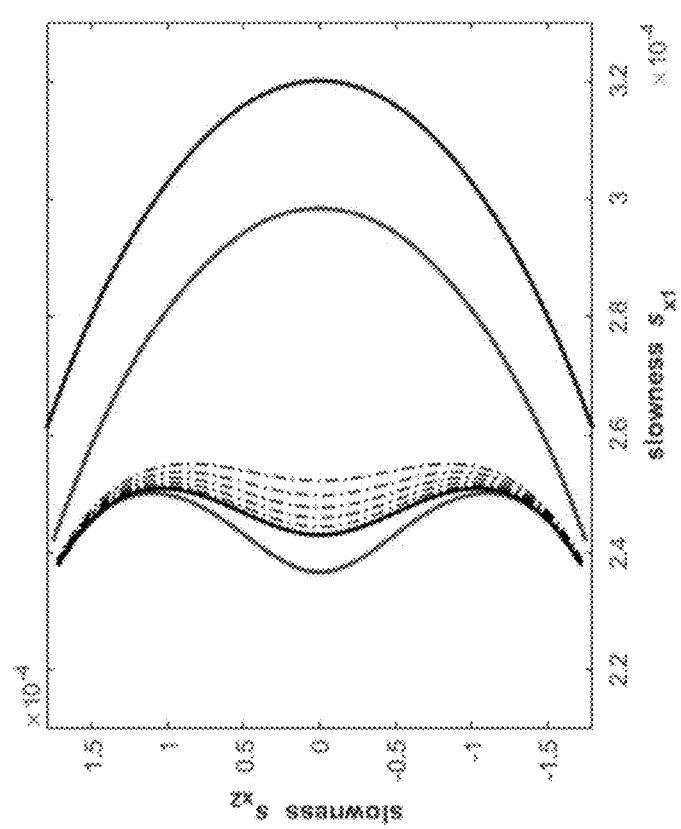
FIG. 11 is an illustration of slowness curves for a linear surface acoustic wave device, according to some implementations.

FIG. 11 shows the surface slowness curve for LSAW on 42° YX-cut LiTaO$_3$, with the solid lines illustrating LSAW under a uniform aluminum lawyer with thickness-frequency product hf from 0 (solid) to 500 m/s (dashed); and with the red curve and blue cure illustrating bulk acoustic waves and Rayleigh waves with energy propagating along the crystal surface, in some implementations. The LSAW on metallized surface exhibits non-convex slowness curvature, with the transversal component of power flow opposite to the phase velocity. This results in instability of C-PML approach in transversal direction. The side PMLs were implemented combining M-PML with implementations of the cascading techniques discussed above; and a three-stage M-PML with r=0.02 and a graded stretching factor was used at each side. The C-PML technique works fine as the bottom PML.

Figure 12:
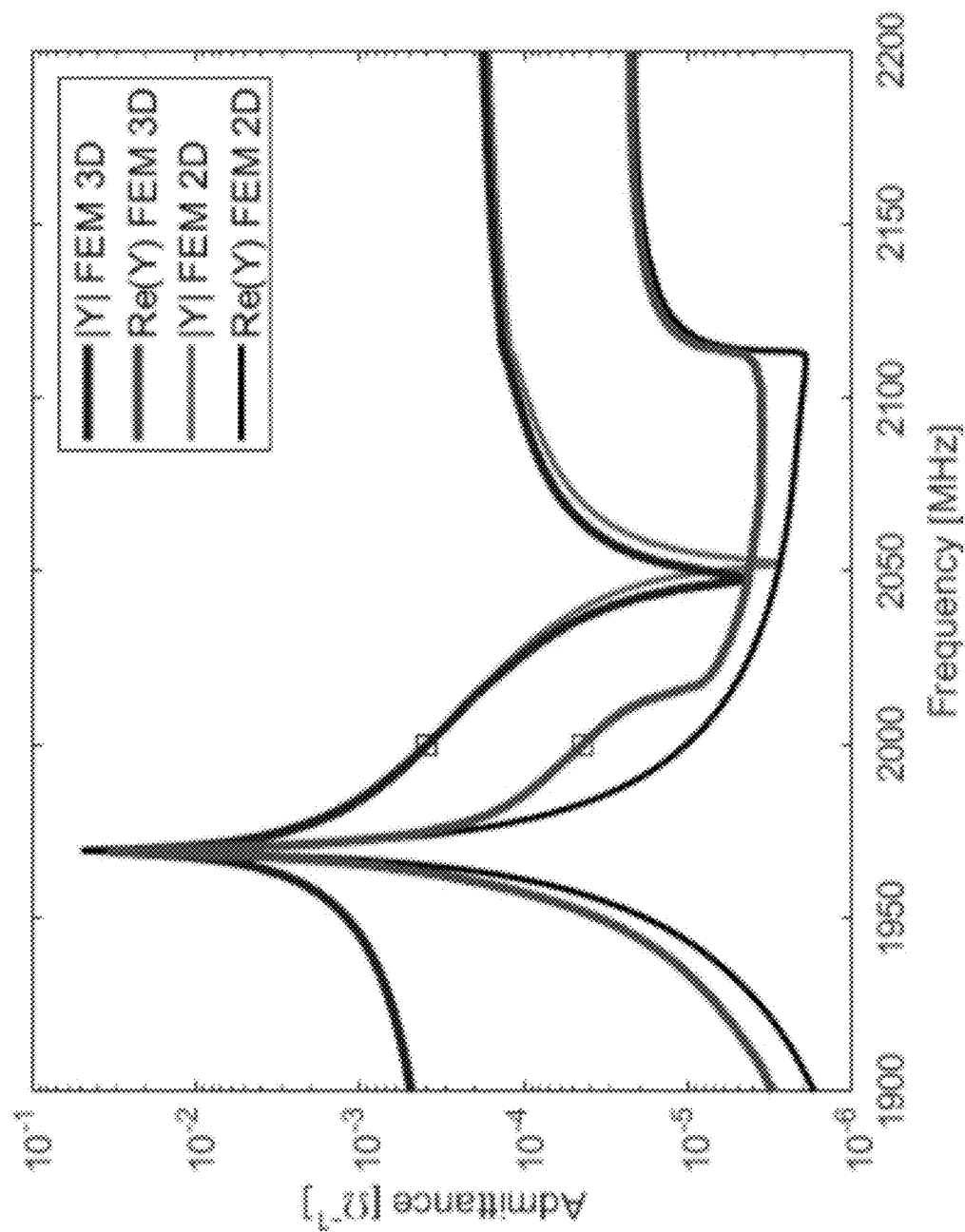
FIG. 12 illustrates graphs of admittance over frequency for example models of a surface acoustic wave device generated via implementations of direct and iterative hierarchical cascading FEM in two and three dimensions.
Figure 13:
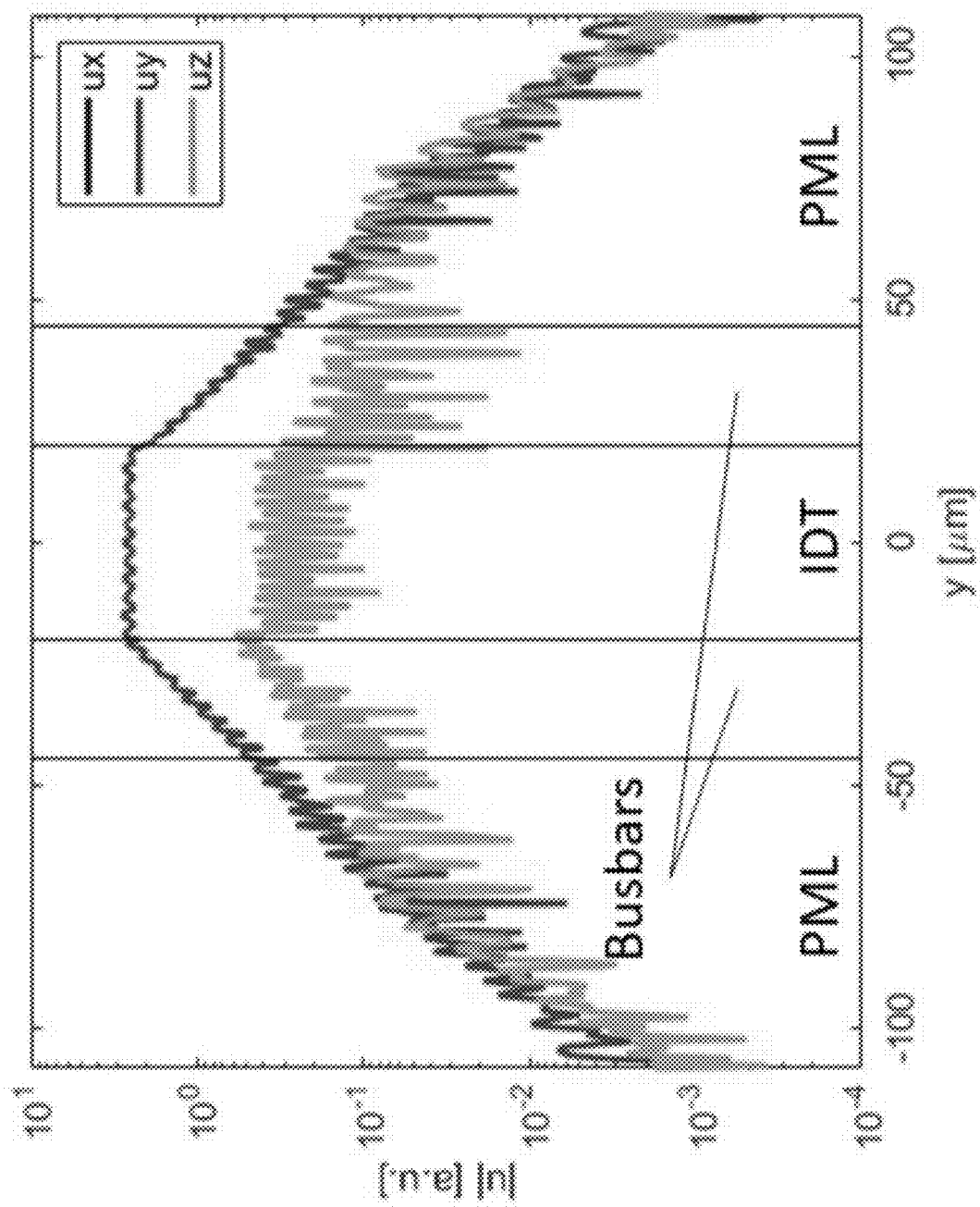
FIG. 13 illustrates example displacement profiles for the surface acoustic wave device of FIG. 12, according to some implementations.

For the limited size device illustrated, the simulation problem is computationally feasible using direct hierarchical cascading, but here we demonstrate the use of iterative cascading. The simulated harmonic admittance is shown in FIG. 12, which illustrates graphs of admittance over frequency for example models of a surface acoustic wave device generated via implementations of direct and iterative hierarchical cascading FEM in two and three dimensions for ease of comparison. The 3D simulation shows pronounced radiation at frequencies above the resonance, characteristic to LSAW radiation to busbars. The interpretation is the confirmed by the displacement profiles shown in FIG. 13. The vertical lines indicate the boundaries between the PMLs, busbars, and the IDT. Note the asymmetry of the shear vertical component. The longitudinal displacement component $u_x$ vanishes due to antisymmetry about the electrode center.

Figure 14:
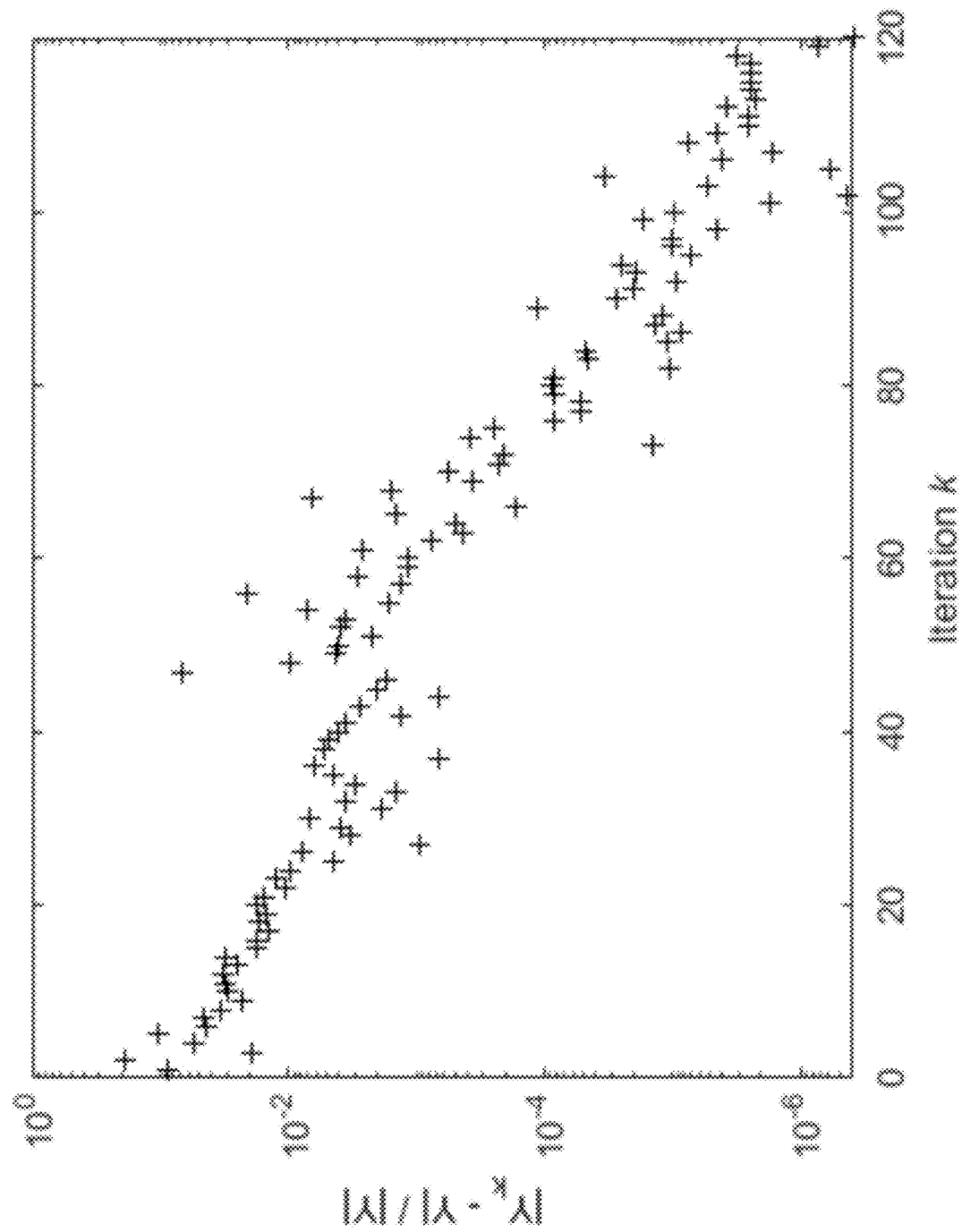
FIG. 14 is an example graph illustrating relative error in estimated harmonic admittance via iterative hierarchical cascading FEM over iteration count, according to some implementations.

FIG. 14 is an example graph illustrating relative error in estimated harmonic admittance via iterative hierarchical cascading FEM over iteration count, according to some implementations shows the convergence of the harmonic admittance at 2000 MHz. An exponential convergence rate is achieved, however with spontaneous fluctuations in the error rate. This behavior seems characteristic to the iterative cascading, repeating over wide range of frequencies and from structure to another. The achieved average simulation speed was about 10-30 min/frequency point, depending on the frequency and on the convergence criterion.

The main advantage of hierarchical cascading in this application is that high quality side PMLs could be used, something which would be difficult to achieve in conventional FEM due to the much higher RAM usage of the latter.

Figure 15:
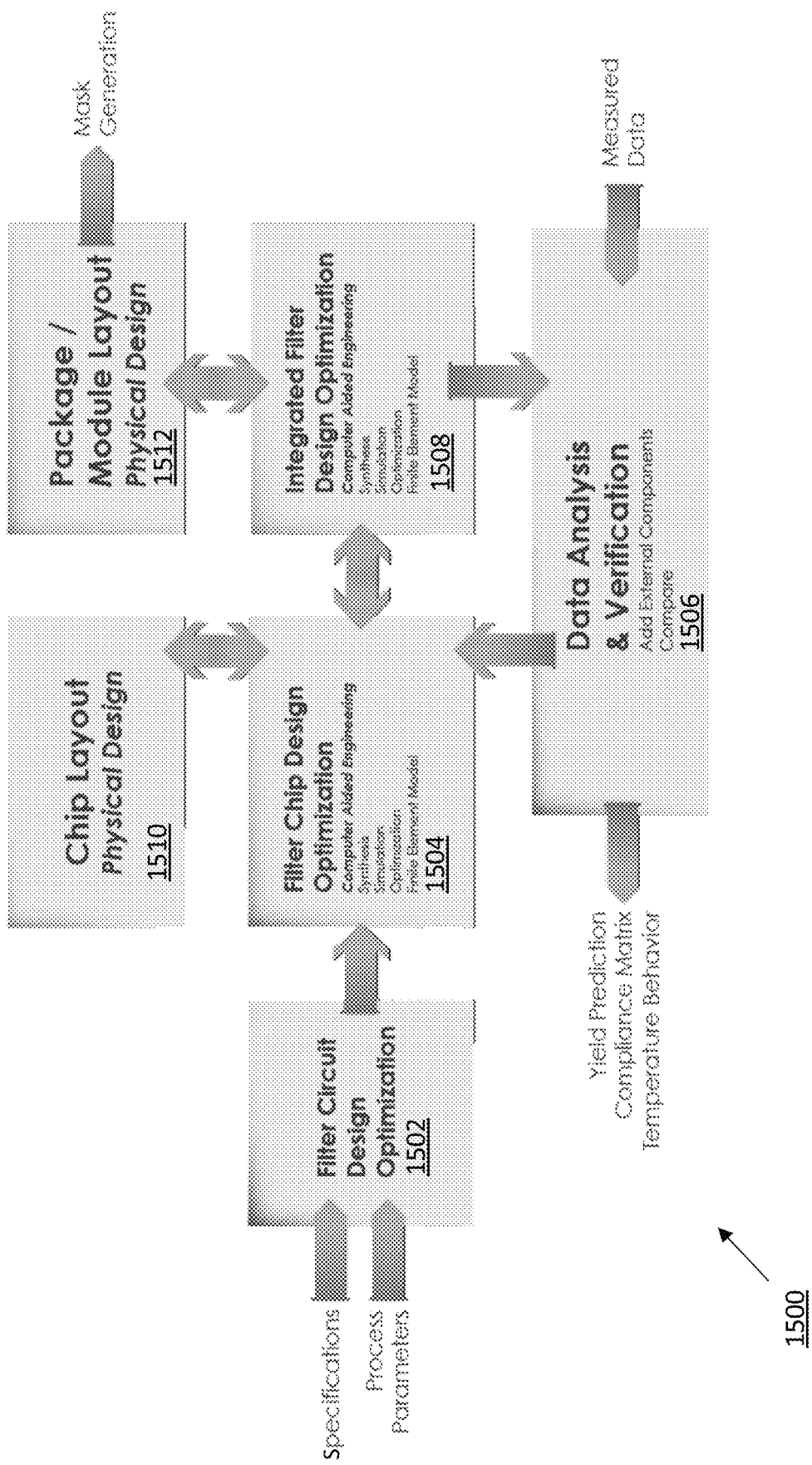
FIG. 15 is a block diagram of an implementation of a system for hierarchical cascading in FEM simulations and for designing electronic filters.
Figure 16:
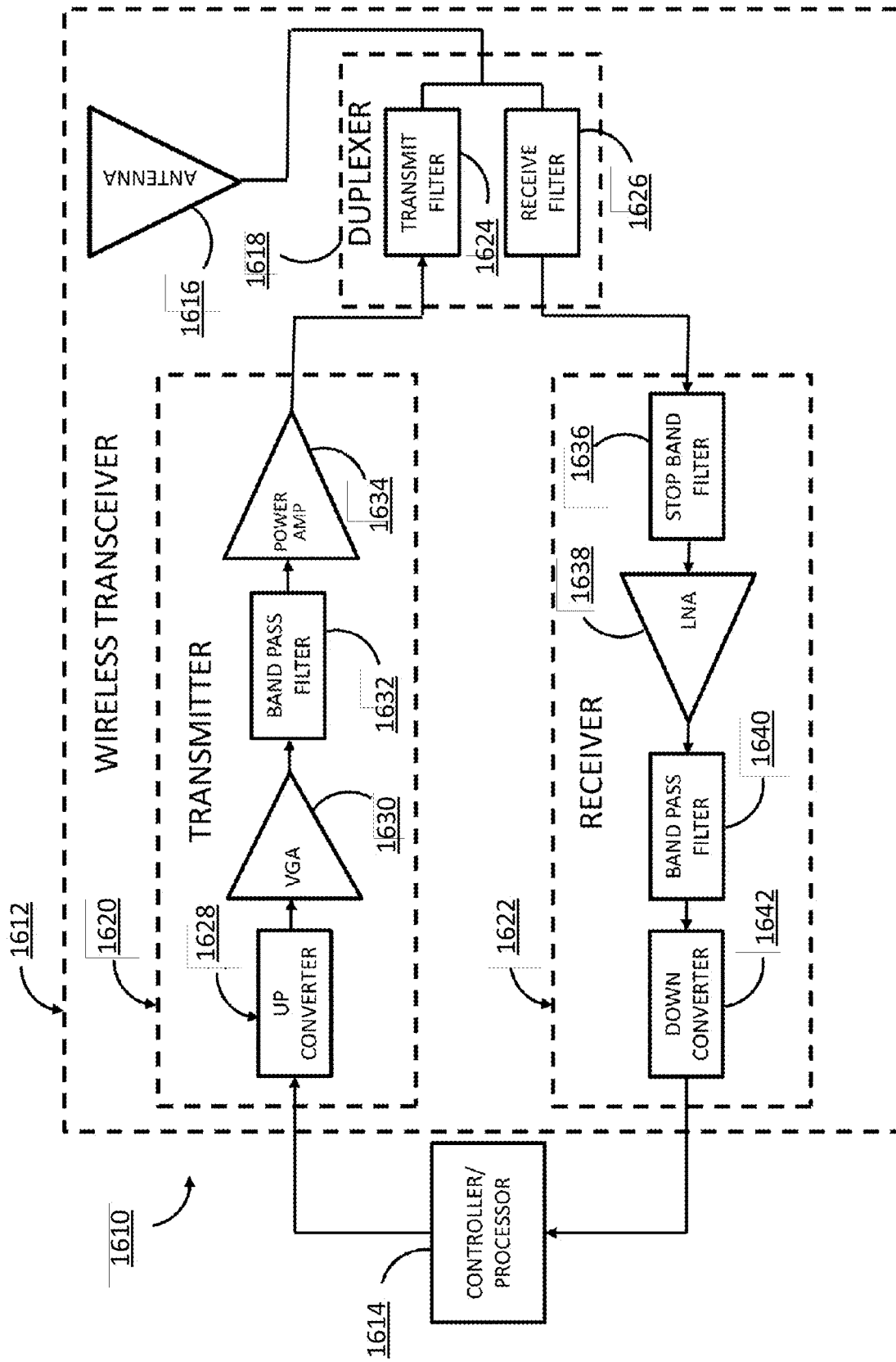
FIG. 16 is a block diagram of a wireless telecommunications system, according to some implementations

The hierarchical cascading approach has proven an efficient and capable tool for simulating of finite SAW devices with FEM. The electric response can be evaluated and loss mechanisms analyzed even in complex layered SAW structures. The approach has been shown feasible for even 3D simulation of finite SAW devices FIG. 15 is a block diagram of an implementation of a system for hierarchical cascading in FEM simulations and for designing electronic filters;

FIG. 16 is a block diagram of a wireless telecommunications system, according to some implementations. The systems and methods discussed herein may be applied to designing acoustic wave microwave filters (such as surface acoustic wave, bulk acoustic wave, film bulk acoustic resonator (FBAR), and microelectromechanical system (MEMS) filters)), such as in the 300 MHz to 300 GHz frequency range, particularly in the 300 MHz to 10.0 GHz frequency range, and even more particularly in the 400-3500 MHz frequency range. Such microwave filters may be either fixed frequency and/or tunable filters (tunable in frequency and/or bandwidth and/or input impedance and/or output impedance), and may be used for single-band or multiple-band bandpass and/or bandstop filtering. Such AW microwave filters are advantageous in applications that have demanding electrical and/or environmental performance requirements and/or severe cost/size constraints, such as those found in the radio frequency (RF) front ends of mobile communications devices, including cellphones, smartphones, laptop computers, tablet computers, etc. or the RF front ends of fixed-location or fixed-path communications devices, including M2M devices, wireless base stations, satellite communications systems, etc.

Example AW microwave filters described herein exhibit a frequency response with a single passband, which is particularly useful in telecommunication system duplexers. For example, with reference to FIG. 16, a telecommunications system 1610 for use in a mobile communications device may include a transceiver 1612 capable of transmitting and receiving wireless signals, and a controller/processor 1614 capable of controlling the functions of the transceiver 1612. The transceiver 1612 generally comprises a broadband antenna 1616, a duplexer 1618 having a transmit filter 1624 and a receive filter 1626, a transmitter 1620 coupled to the antenna 1616 via the transmit filter 1624 of the duplexer 1618, and a receiver 1622 coupled to the antenna 1616 via the receive filter 1626 of the duplexer 1618.

The transmitter 1620 includes an upconverter 1628 configured for converting a baseband signal provided by the controller/processor 1614 to an RF signal, a variable gain amplifier (VGA) 1630 configured for amplifying the RF signal, a bandpass filter 1632 configured for outputting the RF signal within an operating frequency band selected by the controller/processor 1614, and a power amplifier 1634 configured for amplifying the filtered RF signal, which is then provided to the antenna 1616 via the transmit filter 1624 of the duplexer 1618.

The receiver 1622 includes a notch or stopband filter 1636 configured for rejecting signal interference from the RF signal input from the antenna 1616 and transmitter 1620 via the receiver filter 1626, a low noise amplifier (LNA) 1638 configured for amplifying the RF signal from the stop band filter 1636 with a relatively low noise, a bandpass filter 1640 configured for outputting the amplified RF signal within an operating frequency band selected by the controller/processor 1614, and a downconverter 1642 configured for downconverting the RF signal to a baseband signal that is provided to the controller/processor 1614. Alternatively, the function of rejecting signal interference performed by the stop-band filter 1636 can instead or also be performed by the duplexer 1618. And/or, the power amplifier 1634 of the transmitter 1620 can be designed to reduce the signal interference to the receiver 1622.

It should be appreciated that the block diagram illustrated in FIG. 16 is functional in nature, and that several functions can be performed by one electronic component or one function can be performed by several electronic components. For example, the functions performed by the upconverter 1628, VGA 1630, bandpass filter 1640, downconverter 1642, and controller/processor 1614 are oftentimes performed by a single transceiver chip or device. The function of the bandpass filter 1632 can be performed by the power amplifier 1634 and the transmit filter 1624 of the duplexer 1618.

The exemplary technique described herein is used to design acoustic microwave filters for the RF front-end, comprised of the duplexer 1618, transmitter 1620, and receiver 1622, of the telecommunications system 1610, and in particular the transmit filter 1624 of the duplexer 1618, although the same technique can be used to design acoustic microwave filters for the receive filter 1626 of the duplexer 1618 and for other RF filters in the wireless transceiver 1612.

Figure 17:
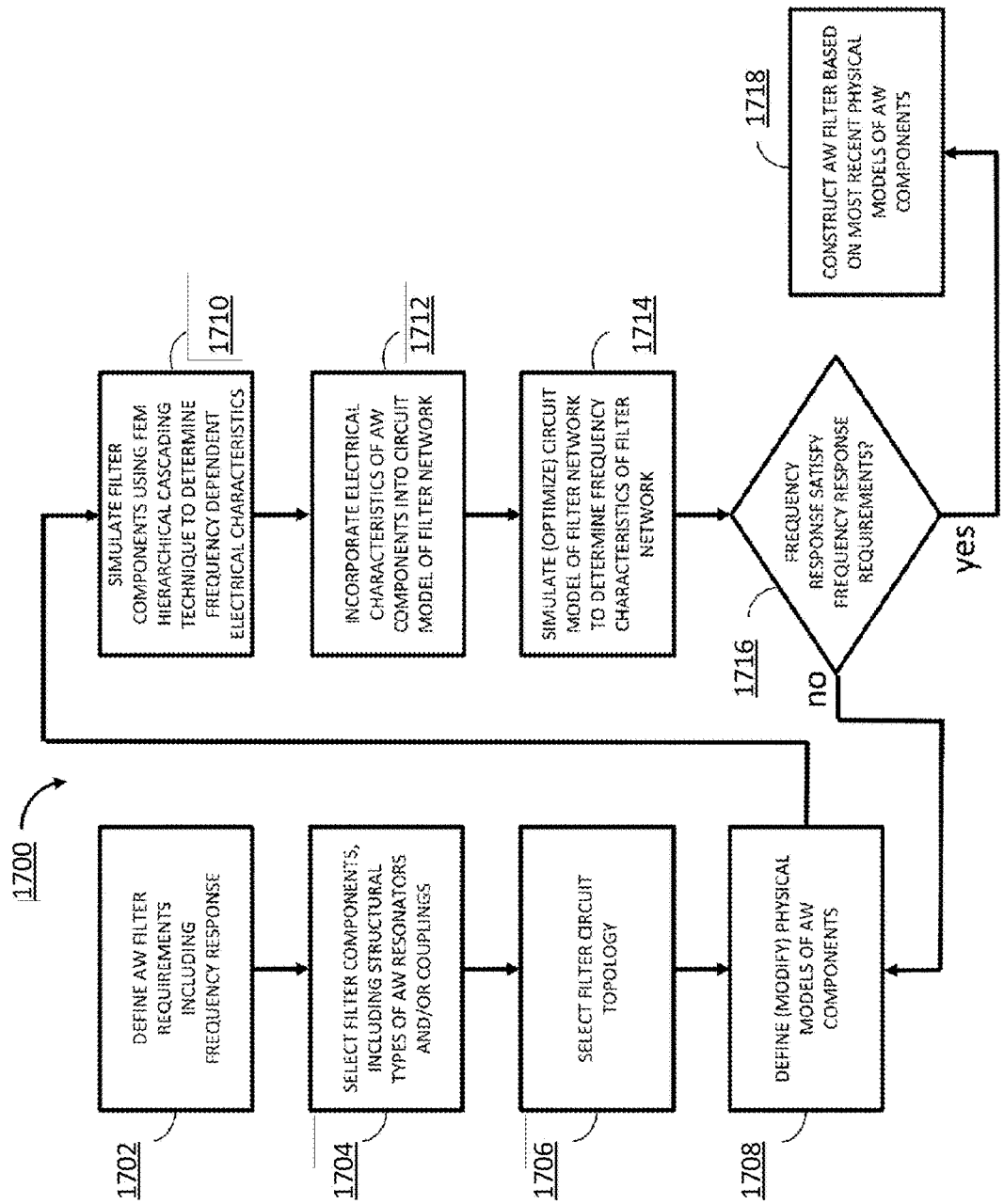
FIG. 17 is a flow diagram illustrating the design and construction of a filter using the FEM hierarchical cascading technique, according to some implementations.

FIG. 17 is a flow diagram illustrating the design and construction of a filter using the FEM hierarchical cascading technique, according to some implementations. First, the filter requirements, which comprise the frequency response requirements (including passband, return loss, insertion loss, rejection, linearity, noise figure, input and output impedances, etc.), as well as size and cost requirements, and environmental requirements, such as operating temperature range, vibration, failure rate, etc., are defined to satisfy the application of the filter (step 1702).

Next, the structural types of circuit elements to be used in the AW filter are selected; for example, the structural type of AW resonators and/or coupling elements (SAW, BAW, FBAR, MEMS, etc.) and the types of inductors, capacitors, and switches, along with the materials to be used to fabricate these circuit elements, including the packaging and assembly techniques for fabricating the filter, are selected (step 1704). For example, as discussed above, SAW resonators may be selected, which may be fabricated by disposing IDTs on a piezoelectric substrate, such as crystalline Quartz, Lithium Niobate $(LiNbO_3)^-$, Lithium Tantalate $(LiTaO_3)$ crystals or BAW (including FBAR) resonators or MEMS resonators. In the particular example described herein, the selected circuit element types are SAW resonators and capacitors constructed on a substrate composed of 42-degree X Y cut $LiTaO_3$.

Then, a filter circuit topology is selected (step 1706). For example, the selected filter circuit topology may be an Nth-order ladder topology (in this case, N=6 meaning the number of resonators equals 6). Nth order ladder topologies are described in U.S. Pat. Nos. 8,751,993 and 8,701,065 and U.S. patent application Ser. No. 14/941,451, entitled "Acoustic Wave Filter with Enhanced Rejection," which are all expressly incorporated herein by reference. Other filter circuit topologies, such as in-line non-resonant-node, or in-line, or in-line with cross couplings, or in-line.

Then, initial physical models of the filter's AW components are defined (or modified), e.g., by selecting a material, one or more of a number of finger pairs, aperture size, mark-to-pitch ratio, and/or transducer metal thickness (step 1708), and the physical models of the AW components are simulated using the FEM hierarchical cascading technique to determine their frequency-dependent electrical characteristics (step 1710). Next, these electrical characteristics of the AW components are incorporated into a circuit model of the entire filter network (step 1712), and the circuit model of the filter network is simulated (optionally optimizing non-AW component parameters) to determine the filter's frequency characteristics (step 1714). The simulated frequency response of the AW filter is then compared to the frequency response requirements defined at step 1702 (step 1716). If the simulated frequency response does not satisfy the frequency response requirements, the process returns to step 1708, where the physical model of the AW is modified. If the simulated frequency response does satisfy the frequency response requirements (step 1702), an actual acoustic filter is constructed based on the most recent physical models of the AW components (step 1714). Preferably, the circuit element values of the actual acoustic filter will match the corresponding circuit element values in the most recent optimized filter circuit design.

Although the FEM hierarchical cascading technique has been disclosed herein as being applied to SAW structures having strict periodicity, it should be appreciated that the FEM hierarchical cascading technique can be applied to devices having breaks in periodicity, such as "hiccup" resonators or devices with "accordion sections." In the case of such devices, the FEM hierarchical cascading technique can be applied to the strictly periodic structures, whereas "one-off" cells or small number of aperiodic cells can be inserted between the periodic sections. Also, it should be clear to a person skilled in the art that the term "SAW," as used herein, includes all types of acoustic waves, such as quasi-Rayleigh waves, "leaky" SAW, Surface Transverse Waves, STW, Lamb modes, etc.—that is, all types of acoustic waves with propagation mainly near the surface of, or in a layer of limited depth, for which components radiated into the bulk represent undesirable "second-order" effects.

Figure 18:
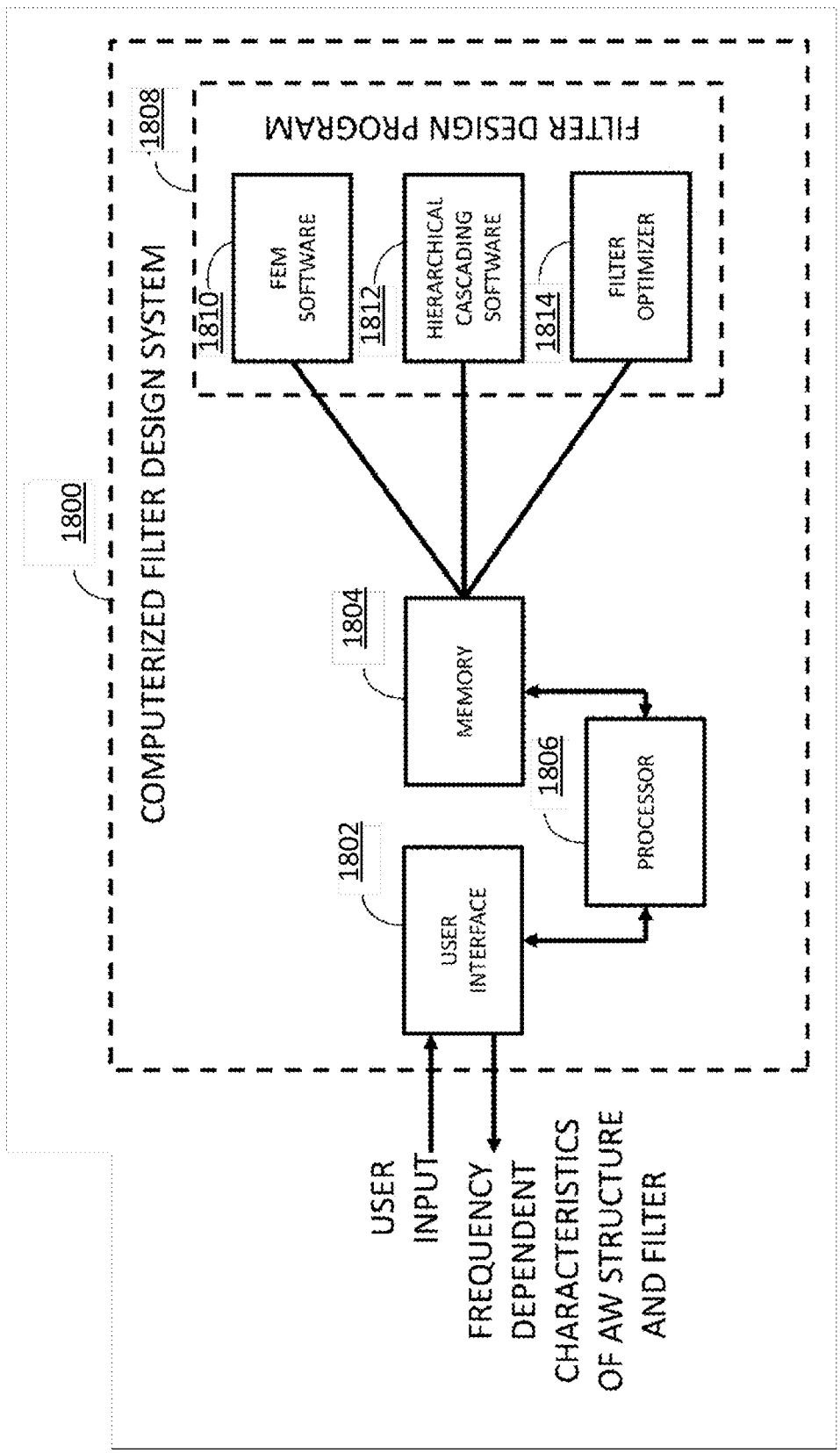
FIG. 18 is a block diagram of a system for hierarchical cascading in FEM simulations and for designing electronic filters, according to some implementations.

Referring to FIG. 18, a computerized filter design system 1800 may be used to simulate an AW structure and an AW filter using the design procedures discussed herein. The computerized filter design system 1800 generally comprises a user interface 1802 configured for receiving information and data from a user (e.g., parameter values defining the physical model of the AW structure and AW filter requirements) and outputting frequency-dependent characteristics of the AW structure and filter to the user; a memory 1804 configured for storing a filter design program 1808 (which may take the form of software instructions, which may include, but are not limited to, routines, programs, objects, components, data structures, procedures, modules, functions, and the like that perform particular functions or implement particular abstract data types), as well as the information and data input from the user via the user interface 1802; and a processor 1806 configured for executing the simulation software program.

The simulation software program 1808 is divided into sub-programs, in particular, a conventional FEM program 1810 (which can be used to compute characteristics of the core blocks and PML absorber blocks); a hierarchical cascading program 1812 (which can be used to partition the physical model, identify core blocks, compute the characteristics of the core blocks, remove DOFs from core blocks, define types of unit blocks, determine hierarchical cascading pattern, identify and cascade sets of adjacent unit blocks, recognize a single unit block subsuming all original unit blocks, terminate the single block with absorber blocks, compute characteristics of absorber blocks, cascade the single subsuming block with the absorber blocks, and determine the frequency-dependent electrical characteristics of the entire terminated AW structure; and a conventional filter optimizer 1814 (which can be used to optimize and simulate the circuit model of the filter network).

Accordingly, the systems and methods discussed herein provide for hierarchical cascading in FEM simulations of SAW devices, which offers drastically reduced memory consumption and simulation times. In some implementations, iterative hierarchical cascading may also be applied to three-dimensional simulations of SAW devices, which may otherwise be too complex for FEM simulations due to the high number of cross-sectional degrees-of-freedom involved In a first aspect, the present disclosure is directed to a method of generating an acoustic wave device. The method includes (a) partitioning, by a computing system, a physical model of an acoustic wave device into a plurality of core unit blocks. The method also includes (b) computing, by the computing system, characteristics for a first core unit block of the plurality of core unit blocks according to a modal matrix based on a first set of basis values. The method also includes (c) calculating, by the computing system, a single block representing the physical model of the acoustic wave device based on the computed characteristics for the first core unit block of the plurality of core unit blocks and derived characteristics for each other core unit block of the plurality of core unit blocks. The method also includes (d) determining, by the computing system, that one or more local errors at each boundary of the plurality of core unit blocks exceeds a threshold. The method also includes (e) responsive to the determination, repeating steps (b)-(d) with an adjusted modal matrix based on a second set of basis values, the second set of basis values comprising at least one independent component of an error vector associated with the one or more local errors. The method also includes (f) comparing, by the computing system, a frequency response of the calculated single block representing the physical model of the acoustic wave device to a set of frequency response requirements, responsive to determining that the one or more local errors at each boundary of the plurality of core unit blocks do not exceed the threshold. The method also includes (g) generating, by the computing system, a set of specifications for the acoustic wave device based on the comparison, the set of specifications serving as an input to a manufacturing process.

In some implementations, the method includes deriving, by the computing system, characteristics for each other core unit block of the plurality of core unit blocks from the computed characteristics for the first core unit block; and combining, by the computing system, the first core unit block and each other core unit block into the single block such that the single block subsumes the first core unit block and each other core unit block. In a further implementation, the method includes hierarchically cascading sets of adjacent unit blocks into the single block. In a still further implementation, the method includes (h) combining sets of adjacent unit blocks at a current hierarchical level to create cascaded unit blocks at a next hierarchical level; and (i) repeating step (h) for sets of adjacent unit blocks for the next hierarchical level until the single block is created, wherein each of the unit blocks is either a core unit block or a previously cascaded unit block. In a yet still further implementation, any of the unit blocks that are not combined at the current hierarchical level are transferred from the current hierarchical level to the next hierarchical level. In a still yet further implementation, a first unit block has previously computed characteristics, and at least one other of the unit blocks is physically and electrically identical to the first unit block, and the method further includes referencing the first unit block to assume the previously computed characteristics for the at least one other unit block when combining the sets of adjacent unit blocks at the current hierarchical level.

In some implementations, the method includes generating an A-matrix having left-side boundary degrees of freedom (DOFs), right-side boundary DOFs, and internal DOFs; and removing the internal DOFs from the A-matrix to generate a B-matrix comprising only the left-side boundary DOFs and the right-side boundary DOFs. In a further implementation, the characteristics of each other core unit block of the plurality of core unit blocks are derived from the B-matrix of the first core unit block. In a still further implementation, the method includes cascading a first set of adjacent unit blocks into a first cascaded unit block by: combining B-matrices of the respective adjacent unit blocks of the first set into a first C-matrix having left-side boundary DOFs corresponding to the left-side boundary DOFs of a left one of the adjacent unit blocks, right-side boundary DOFs corresponding to a right one of the adjacent unit blocks, and internal DOFs corresponding to at least one shared edge between the adjacent unit blocks; and reducing the first C-matrix by removing the internal DOFs from the first C-matrix to a first new cascaded B-matrix of a first cascaded unit block comprising only left-side boundary DOFs and right-side boundary DOFs.

In some implementations, the method includes identifying the one or more local errors as stress discontinuities across boundaries between unit blocks. In some implementations, the method includes identifying the one or more local errors as differences of displacement to that imposed by approximate boundary stresses between unit blocks. In some implementations, the computed characteristics for the first core unit block comprise acoustic and electric fields. In some implementations, all of the core unit blocks are physically identical to each other. In other implementations, at least two of the core unit blocks are physically different from each other.

In another aspect, the present disclosure is directed to a filter design system. The system includes a processor; an interface coupled to the processor; and memory storing a hierarchical cascading program. Execution of the hierarchical cascading program by the processor causes the filter design system to perform actions comprising: (a) partitioning a physical model of an acoustic wave device into a plurality of core unit blocks; (b) computing characteristics for a first core unit block of the plurality of core unit blocks according to a modal matrix based on a first set of basis values; (c) calculating a single block representing the physical model of the acoustic wave device based on the computed characteristics for the first core unit block of the plurality of core unit blocks and derived characteristics for each other core unit block of the plurality of core unit blocks; (d) determining that one or more local errors at each boundary of the plurality of core unit blocks exceeds a threshold; (e) responsive to the determination, repeating steps (b)-(d) with an adjusted modal matrix based on a second set of basis values, the second set of basis values comprising at least one independent component of an error vector associated with the one or more local errors; (f) comparing a frequency response of the calculated single block representing the physical model of the acoustic wave device to a set of frequency response requirements, responsive to determining that the one or more local errors at each boundary of the plurality of core unit blocks do not exceed the threshold; and (g) generating a set of specifications for the acoustic wave device based on the comparison, the set of specifications serving as an input to a manufacturing process.

In some implementations, execution of the hierarchical cascading program further causes the filter design system to: derive characteristics for each other core unit block of the plurality of core unit blocks from the computed characteristics for the first core unit block; and combine the first core unit block and each other core unit block into the single block such that the single block subsumes the first core unit block and each other core unit block. In some implementations, In some implementations, execution of the hierarchical cascading program further causes the filter design system to hierarchically cascade sets of adjacent unit blocks into the single block. In a further implementation, execution of the hierarchical cascading program further causes the filter design system to: (h) combine sets of adjacent unit blocks at a current hierarchical level to create cascaded unit blocks at a next hierarchical level; and (i) repeat step (h) for sets of adjacent unit blocks for the next hierarchical level until the single block is created, wherein each of the unit blocks is either a core unit block or a previously cascaded unit block.

In some implementations, execution of the hierarchical cascading program further causes the filter design system to identify the one or more local errors as stress discontinuities across boundaries between unit blocks. In some implementations, execution of the hierarchical cascading program further causes the filter design system to identify the one or more local errors as differences of displacement to that imposed by approximate boundary stresses between unit blocks.

Although discussed above in terms of serial processing and calculations, hierarchical cascading lends itself particularly well to parallelization. Specifically, in many implementations, simulation calculation may require many millions of discrete calculations. Implementations of SAW multiplexers may include as many as dozens or even hundreds of acoustic devices. Optimization of the design for the multiplexer and the individual acoustic devices is tightly coupled and highly constrained, such that any modification to one resonator, for example, may have cascading effects requiring modifications to many other devices in the circuit to compensate for changes. However, these modifications may be simulated in parallel to enable quick feedback of the effects of each change.

Figure 19:
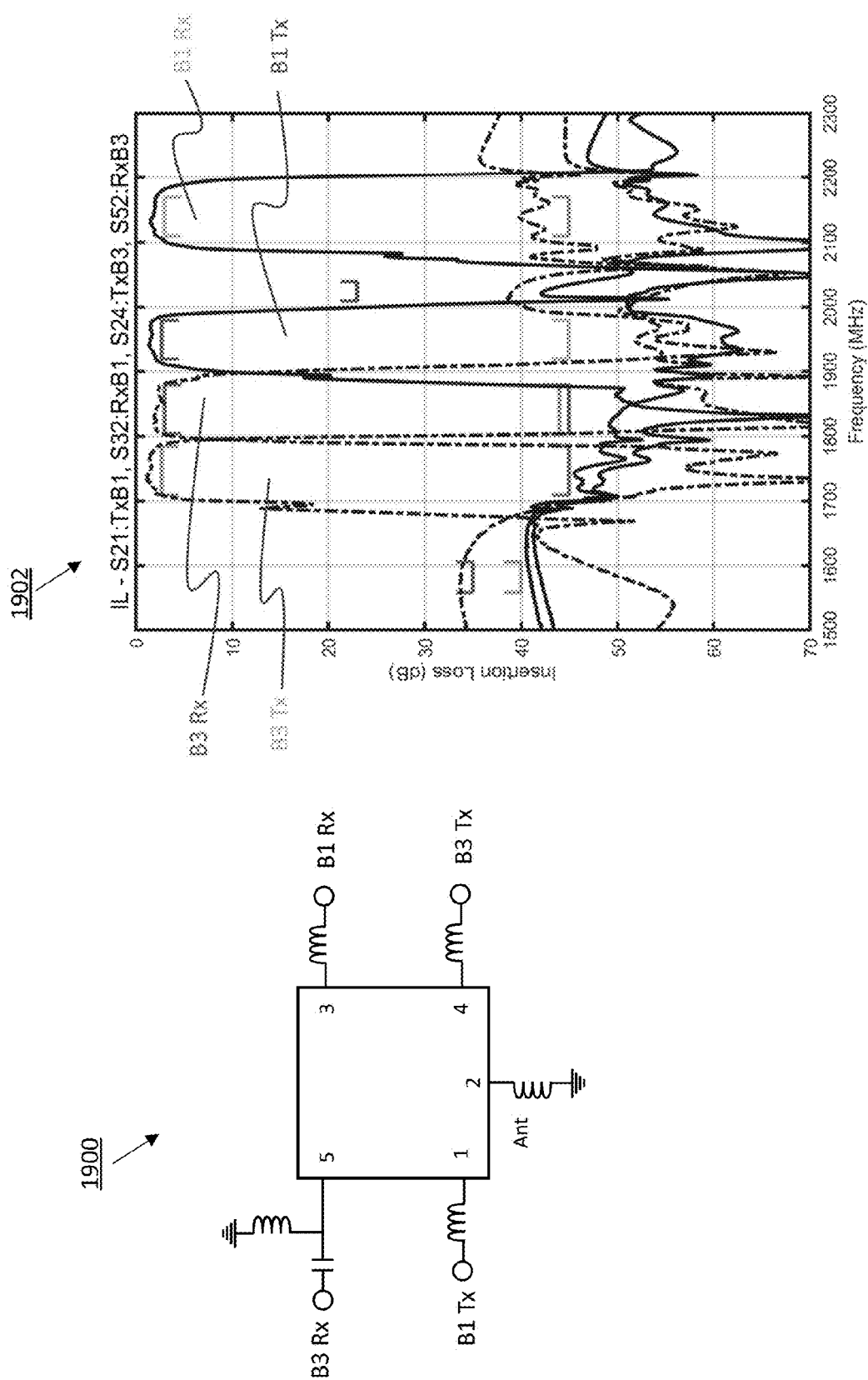
FIG. 19 is an illustration of an implementation of an example SAW multiplexer device and a corresponding graph of insertion loss by frequency for different inputs of the multiplexer device.

For example, FIG. 19 is an illustration of an implementation of an example SAW multiplexer device 1900 and a corresponding graph 1902 of insertion loss by frequency for different inputs of the multiplexer device 1900. A typical implementation of such a quadplexer device 1900 may include 32 unique SAW resonators. Output characteristics of the device may be simulated across a wide frequency band (e.g. 700 MHz) with high resolution (e.g. 0.5 MHz increments, yielding 1401 frequency points). Given a finite time to perform the output calculations for each frequency point for one resonator of 1 second, the total simulation of the quadplexer would require 44,832 seconds or 12.45 hours of simulation time) This may be impractical for many uses, particularly as designs are updated or modified, requiring repeated re-simulation.

However, the calculations at each frequency point are independent of each other, and accordingly, the simulation may be divided amongst a plurality of computing units (e.g. virtual machines in a cloud server, physical machines in a cluster, etc.). Frequency ranges may be provided to each computing unit for simulation, and an aggregating device may merge the results to generate a complete model, allowing for parallel calculation of sub-models.

In addition to distributing simulations by frequency range, modeling of core blocks may similarly be parallelized by assigning different computing units of the cluster or cloud to model or solve matrices for different blocks. For example, as discussed above in connection with FIG. 4G, through hierarchical cascading, a highly complex acoustic device may be simulated as a combination of unit blocks. In the example of FIG. 4G, three unique unit blocks may be used to represent the entire device through various combinations. Each of the unit blocks may be considered independently for modeling, and thus may be parallelized by providing characteristics of each block to different computing units for calculation. After the resulting models are returned to a management service, combined blocks of the next layer in the hierarchy may be similarly assigned for calculation to different computing units. While each layer of the hierarchy may need to be solved before proceeding onwards, the individual calculations of core blocks and combinations of core blocks may be performed asynchronously and independently by different computing units, and thus, there is no need for complex synchronization or read/write management. This allows for easy and efficient parallelization and scalability.

Figure 20:
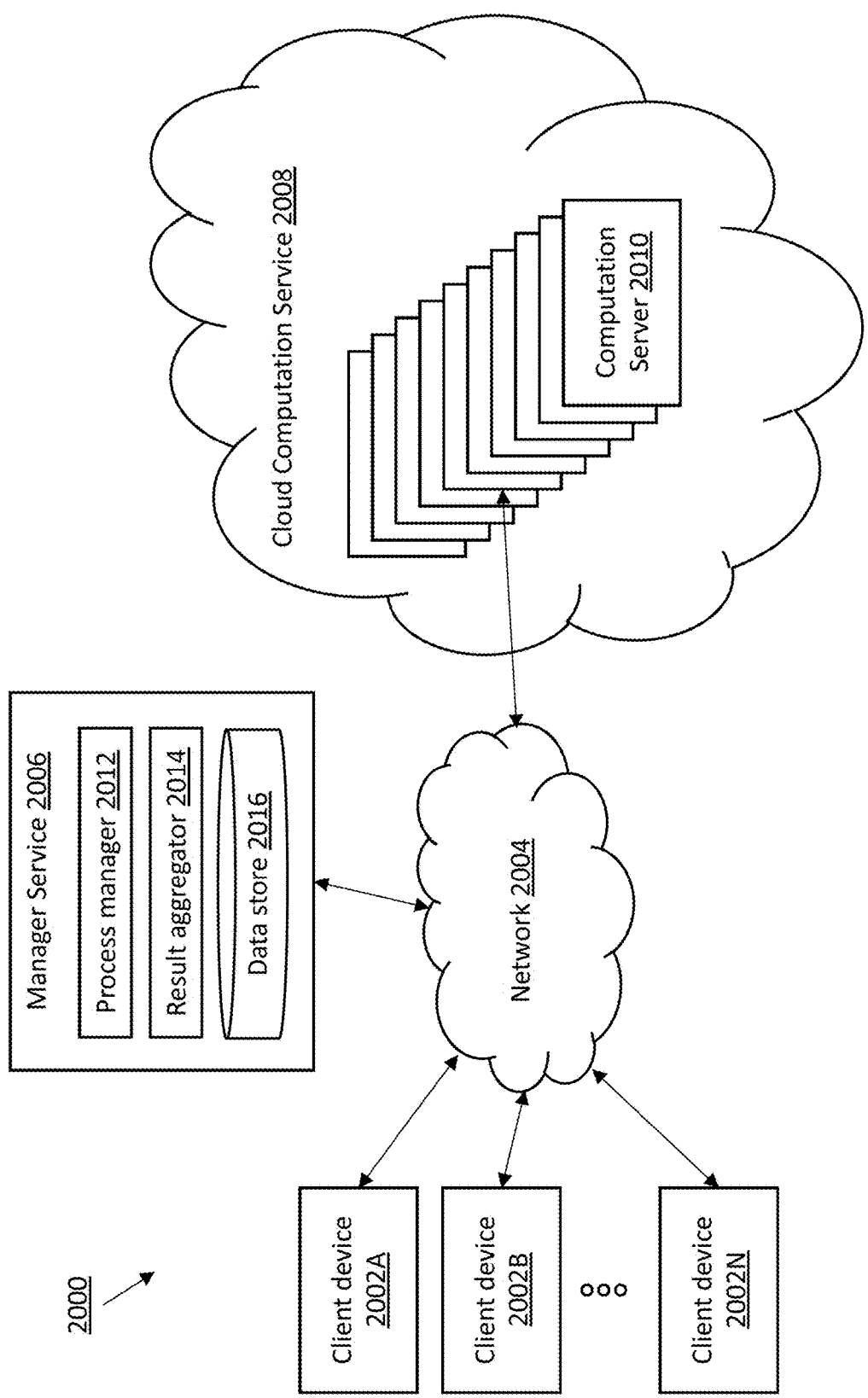
FIG. 20 is a block diagram of an implementation of a system for parallel computing of hierarchical cascading in FEM simulations.

FIG. 20 is a block diagram of an implementation of a system 2000 for parallel computing of hierarchical cascading in FEM simulations. One or more client devices 2002A-2002N (referred to generally as client device(s) 2002) operated on behalf of a circuit designer, analyst, or engineer may communicate via a network 2004 with a manager service 2006 and/or one or more computation servers 2010 of a cloud computation service 2008.

Client device(s) 2002 may comprise any type and form of computing device, including laptop computers, desktop computers, embedded computers, portable or wearable computers such as tablet computing devices, virtual computing devices executed by one or more physical computing devices (e.g. remote or hosted desktop computing devices, web applications accessed by other computing devices, etc.). Client device(s) 2002 may be operated by a designer or analyst to provide frequency response requirements, physical structure limitations or designs, components, topology information, or other configuration details or characteristics of one or more acoustic devices, including filters, resonators, multiplexers, etc., referred to generally as configuration information, to a manager service 2006 for parallelization and processing. Client devices(s) may comprise one or more components of implementations of a computerized filter design system 1800 as discussed above, including memory devices, processors, user interfaces, operating systems, applications, network interfaces, or other such devices.

Client devices(s) 2002 may communicate via a network 2004, which may comprise a wide area network (WAN) such as the Internet, a local area network (LAN), a virtual private network (VPN), a cellular network, a satellite network, a broadband network, or any combination of these or other networks. For example, in many implementations, a client device 2002 may communicate via a LAN to a switch or gateway to a fiber-based wide area network, with communications encrypted via a VPN connection with a manager service 2006. Client device(s) 2002 may thus comprise any appropriate physical interface(s) including Ethernet interfaces, cellular interfaces, 802.11 (WiFi) interfaces, Bluetooth interfaces, or any other type and form of communications interface or interfaces.

Manager service 2006 may comprise one or more computing devices, including laptop computers, desktop computers, embedded computers, portable or wearable computers such as tablet computing devices, virtual computing devices executed by one or more physical computing device, or any other type and form of computing device. In some implementations, manager service 2006 may comprise a web application or other hosted application provided by a web server, database server, application server, or other such entity. In many implementations, manager service 2006 may comprise a plurality of virtual computing devices provided by one or more physical computing device (e.g. a cloud service or cloud application, etc.). Manager service 2006 may receive configuration information for acoustic devices from one or more client devices 2002 and may assign portions of a model or sets of calculations to different computation servers or computation units 2010 provided by a cloud computation service 2008.

Cloud computation service 2008 may comprise one or more physical computing devices executing one or more virtual computing devices (instantiating or executing such virtual computing devices as needed to fulfill processing requirements, in many implementations) and may be deployed as a cluster, cloud, server farm, or other such deployment. In many implementations, a plurality of virtual computing devices may appear to a user of a client device 2002 as a single massively parallel computing device, which may be managed or accessed by a manager service 2006. Although shown both connected to network 2004, in many implementations, cloud computation service 2008 may communicate with manager service 2006 via a second network or networks 2004. Similarly, although shown separate, in many implementations, manager service 2006 may comprise a computation server 2010 of the cloud computation service 2008 (e.g. a first server 2010 acting as a manager, master, host, or otherwise directing or assigning tasks and aggregating results from other computation servers 2010).

Figure 21:
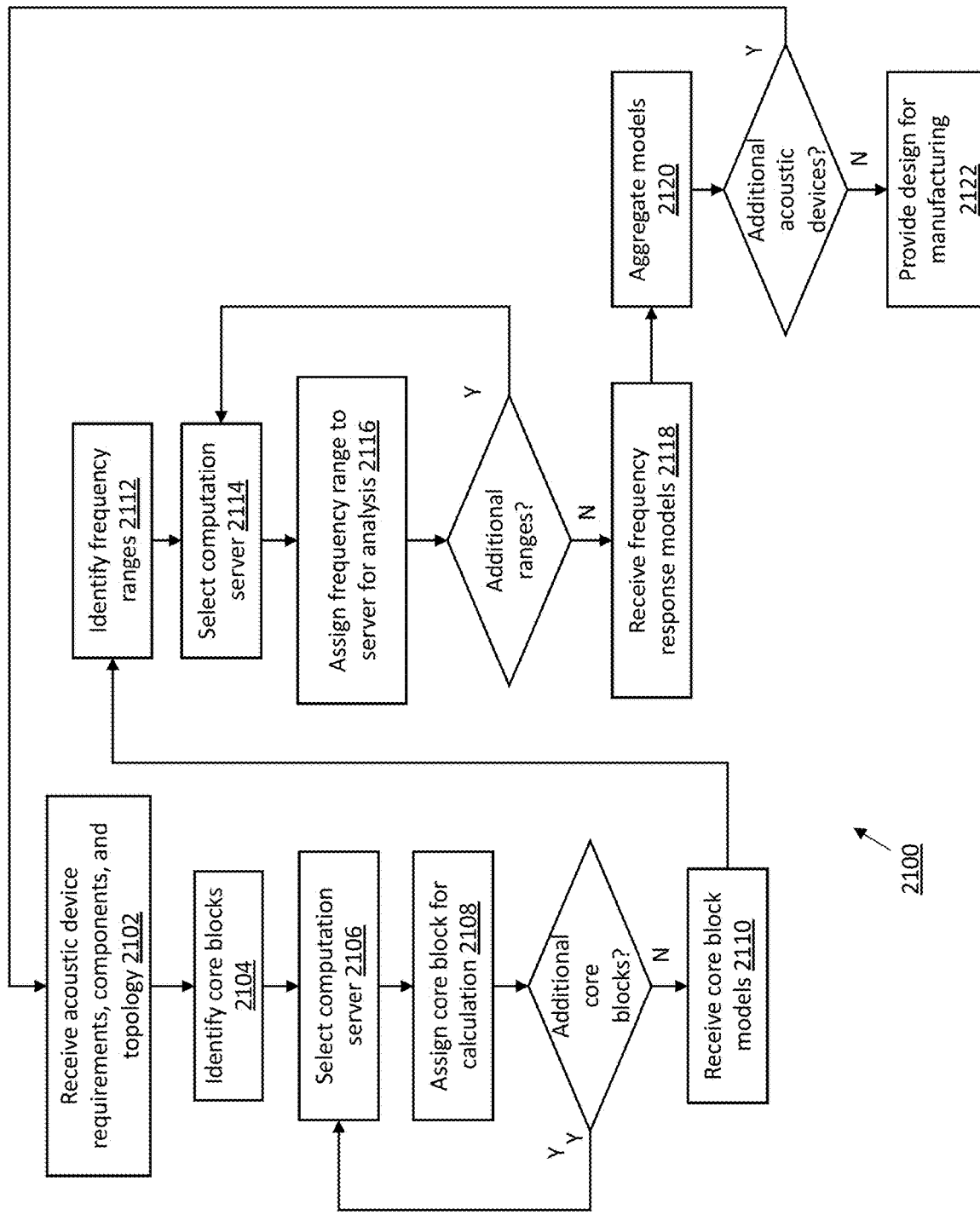
FIG. 21 is a flow chart of an implementation of a method for parallel computing hierarchical cascading in FEM simulations.

FIG. 21 is a flow chart of an implementation of a method 2100 for parallel computing hierarchical cascading in FEM simulations. At step 2012 in some implementations, a manager service may receive filter or frequency requirements, components, topology, or other device characteristics or configurations from one or more client devices. The configuration information may be sent via any suitable method, including as XML data, one or more arrays, a database or flat file, a circuit diagram or graph, a 2D or 3D model, or any other suitable format.

At step 2104, in some implementations, the manager service may identify one or more core blocks for analysis. As discussed above, the manager service may generate a physical model of a device and may partition the physical model into a plurality of core unit blocks. Each core unit block may be associated with a fundamental unit of the model (e.g. at a lowest level of the hierarchy).

At step 2106, the manager service may select a computation server of a plurality of computation servers. In some implementations, the manager service may select a server based on load (e.g. a server having a lowest processor or memory utilization), based on latency (e.g. a server having lowest latency in communications to the manager service), via a round robin method, or any other such method. In some implementations, selecting the server may comprise instantiating or executing the server (or directing a cloud service to instantiate or execute the server, in some implementations). At step 2108, the manager service may assign a core block to the selected computation server for processing and analysis. Assigning the core block to the selected computation server may comprise transmitting configuration information of the core block, parameters of a physical model of the core block, frequency requirements, topology, or other information, or similar data. The selected computation server may compute characteristics for the core unit block as discussed above. For example, in some implementations, the computation server may compute characteristics for the core unit block according to a model matrix based on a set of basis values. Steps 2106-2018 may be repeated iteratively for each additional core block of the model.

At step 2110, the manager service may receive the calculated core block models from each of the computation servers. Once all models have been received, the manager service may, in some implementations, aggregate the core block models into a single model, for example, by deriving a single block representing the physical model of the device. In other implementations, the manager service may provide the models to a computation server, which may derive the single block, as discussed above. In still other implementations, the manager service may provide the core block models to each of a plurality of computation servers for subsequent processing.

At step 2112, in some implementations, the manager service may identify one or more frequency ranges subdividing a range according to a frequency response requirement of the acoustic device. Each range may be assigned to a separate computation server by the manager service, e.g., by selecting a server at step 2114, and assigning the range to the server for calculating a transfer function at sample points within the assigned frequency range at step 2116. In some implementations, each computation server may also perform optimizations on the model during analysis as discussed above (e.g. adjusting the modal matrix for a core unit block based on error vectors, etc.). Such optimizations may be performed if, for example, the calculated transfer function or frequency response within the predetermined range does not meet frequency requirements for the device, as discussed above. Steps 2114-2116 may be repeated for each additional frequency range with additional computation servers.

At step 2118, the manager service may receive transfer functions or frequency responses within each assigned range from the computation servers, and at step 2120, may aggregate the received models into a frequency response across the entire combined frequency range. Aggregating the models may comprise generating a single frequency response across the entire range (e.g. by summing the individually calculated responses, by appending them to one another at each range border, etc.). In some implementations, aggregating the models may also comprise comparing the aggregated frequency response to frequency response requirements, and if the aggregated response matches the requirements or meets the requirements, generating a set of specifications for the acoustic wave device based on the comparison.

The process may be repeated iteratively or in parallel for additional acoustic devices or components that are part of the circuit in some implementations. For example, the manager service may parallelize analysis of a first acoustic device by segmenting the device into core unit blocks and assigning the blocks to a first set of computation servers for analysis, and simultaneously (or while waiting for results from the analysis) may parallelize analysis of a second acoustic device for a second set of computation servers. According, analysis, modeling, and optimization of even very complex devices may be divided amongst a plurality of computation servers acting independently under control of the manager service, drastically increasing efficiency and reducing time spent to perform calculations and model the devices. Once all analysis and modeling is complete, then in some implementations at step 2122, the design specifications may be provided to another computing device for manufacturing (e.g. for control over manufacturing processes).

Accordingly, in one aspect, the present disclosure is directed to a method of generating an acoustic wave device via parallel computing. The method includes partitioning, by a manager service executed by a computing device, a physical model of an acoustic wave device into a plurality of core unit blocks. The method also includes assigning, by the manager service, each core unit block of the plurality of core unit blocks to a corresponding computing device of a plurality of additional computing devices, each additional computing device computing characteristics for the corresponding core unit block according to a modal matrix based on a first set of basis values. The method also includes determining, by the manager service, a single block representing the physical model of the acoustic wave device based on the computed characteristics for the core unit blocks. The method also includes generating, by the computing system, a set of specifications for the acoustic wave device based on the computed characteristics, the set of specifications serving as an input to a manufacturing process.

In some implementations, the method includes determining the single block by providing the plurality of core unit blocks to at least one additional computing device, the at least one additional computing device combining the plurality of core unit blocks into a single block that subsumes each core unit block by hierarchically cascading sets of adjacent unit blocks into the single block. In some implementations, the method includes determining the single block by combining, by the manager service, each core unit block into the single block such that the single block subsumes each core unit block by hierarchically cascading sets of adjacent unit blocks into the single block. In a further implementation, hierarchically cascading sets of adjacent unit blocks into the single block includes, for each of one or more sets of adjacent unit blocks of a hierarchical level of a plurality of hierarchical levels, combining sets of adjacent unit blocks at the hierarchical level to create cascaded unit blocks at a next hierarchical level until the single block is created, wherein each of the unit blocks is either a core unit block or a previously cascaded unit block. In a still further implementation, any of the unit blocks that are not combined at the current hierarchical level are transferred from the current hierarchical level to the next hierarchical level. In a yet still further implementation, a first unit block has previously computed characteristics, and at least one other of the unit blocks is physically and electrically identical to the first unit block, and the method further includes referencing the first unit block to assume the previously computed characteristics for the at least one other unit block when combining the sets of adjacent unit blocks at the current hierarchical level.

In some implementations, the method includes generating the set of specifications by: partitioning, by the manager service, a predetermined frequency range into a plurality of sub-ranges; and assigning, by the manager service, each sub-range to a corresponding computing device of the plurality of additional computing devices, each additional computing device computing characteristics of the single block representing the physical model of the acoustic wave device for one or more frequencies within the corresponding assigned sub-range.

In some implementations, the computed characteristics for the first core unit block comprise acoustic and electric fields. In some implementations, all of the core unit blocks are physically identical to each other. In some implementations, at least two of the core unit blocks are physically different from each other.

In another aspect, the present disclosure is directed to a filter design system. The system includes a processor; an interface coupled to the processor; and memory storing a distributed hierarchical cascading program. When executed by the processor, the distributed hierarchical cascading program causes the filter design system to perform actions including: partitioning a physical model of an acoustic wave device into a plurality of core unit blocks; assigning each core unit block of the plurality of core unit blocks to a corresponding computing device of a plurality of additional computing devices, each additional computing device computing characteristics for the corresponding core unit block according to a modal matrix based on a first set of basis values; determining a single block representing the physical model of the acoustic wave device based on the computed characteristics for the core unit blocks; and generating a set of specifications for the acoustic wave device based on the comparison, the set of specifications serving as an input to a manufacturing process.

In some implementations, execution of the distributed hierarchical cascading program further causes the filter design system to: provide the plurality of core unit blocks to at least one additional computing device, the at least one additional computing device combining the plurality of core unit blocks into a single block that subsumes each core unit block by hierarchical cascading sets of adjacent unit blocks into the single block.

In some implementations, execution of the distributed hierarchical cascading program further causes the filter design system to combine each core unit block into the single block such that the single block subsumes each core unit block by hierarchically cascading sets of adjacent unit blocks into the single block. In a further implementation, execution of the distributed hierarchical cascading program further causes the filter design system to, for each of one or more sets of adjacent unit blocks of a hierarchical level of a plurality of hierarchical levels, combine sets of adjacent unit blocks at the hierarchical level to create cascaded unit blocks at a next hierarchical level until the single block is created, wherein each of the unit blocks is either a core unit block or a previously cascaded unit block. In a still further implementation, any of the unit blocks that are not combined at the current hierarchical level are transferred from the current hierarchical level to the next hierarchical level. In a yet still further implementation, a first unit block has previously computed characteristics, and at least one other of the unit blocks is physically and electrically identical to the first unit block, and the first unit block is referenced to assume the previously computed characteristics for the at least one other unit block when combining the sets of adjacent unit blocks at the current hierarchical level.

In some implementations, execution of the distributed hierarchical cascading program further causes the filter design system to: partition a predetermined frequency range into a plurality of sub-ranges; and assign each sub-range to a corresponding computing device of the plurality of additional computing devices, each additional computing device computing characteristics of the single block representing the physical model of the acoustic wave device for one or more frequencies within the corresponding assigned sub-range.

In some implementations, the computed characteristics for the first core unit block comprise acoustic and electric fields. In some implementations, all of the core unit blocks are physically identical to each other. In some implementations, at least two of the core unit blocks are physically different from each other.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed:

1. A method of generating an acoustic wave device via parallel computing, comprising:
    partitioning, by a manager service executed by a computing device, a physical model of an acoustic wave device into a plurality of core unit blocks;
    assigning, by the manager service, each core unit block of the plurality of core unit blocks to a corresponding computing device of a plurality of additional computing devices, each additional computing device computing characteristics for the corresponding core unit block according to a modal matrix based on a first set of basis values;
    determining, by the manager service, a single block representing the physical model of the acoustic wave device based on the computed characteristics for the core unit blocks; and
    generating, by the computing system, a set of specifications for the acoustic wave device based on the computed characteristics, the set of specifications serving as an input to a manufacturing process.

2. The method of claim 1, wherein determining the single block further comprises providing the plurality of core unit blocks to at least one additional computing device, the at least one additional computing device combining the plurality of core unit blocks into a single block that subsumes each core unit block by hierarchical cascading sets of adjacent unit blocks into the single block.

3. The method of claim 1, wherein determining the single block further comprises combining, by the manager service, each core unit block into the single block such that the single block subsumes each core unit block by hierarchically cascading sets of adjacent unit blocks into the single block.

4. The method of claim 3, wherein hierarchically cascading sets of adjacent unit blocks into the single block further comprises:
    for each of one or more sets of adjacent unit blocks of a hierarchical level of a plurality of hierarchical levels, combining sets of adjacent unit blocks at the hierarchical level to create cascaded unit blocks at a next hierarchical level until the single block is created, wherein each of the unit blocks is either a core unit block or a previously cascaded unit block.

5. The method of claim 4, wherein any of the unit blocks that are not combined at the current hierarchical level are transferred from the current hierarchical level to the next hierarchical level.

6. The method of claim 5, wherein a first unit block has previously computed characteristics, and at least one other of the unit blocks is physically and electrically identical to the first unit block, the method further comprising referencing the first unit block to assume the previously computed characteristics for the at least one other unit block when combining the sets of adjacent unit blocks at the current hierarchical level.

7. The method of claim 1, wherein the computed characteristics for the first core unit block comprise acoustic and electric fields.

8. The method of claim 1, wherein all of the core unit blocks are physically identical to each other.

9. The method of claim 1, wherein at least two of the core unit blocks are physically different from each other.

10. A method, comprising:
partitioning, by a manager service executed by a computing device, a physical model of an acoustic wave device into a plurality of core unit blocks;
assigning, by the manager service, each core unit block of the plurality of core unit blocks to a corresponding computing device of a plurality of additional computing devices, each additional computing device computing characteristics for the corresponding core unit block according to a modal matrix based on a first set of basis values;
determining, by the manager service, a single block representing the physical model of the acoustic wave device based on the computed characteristics for the core unit blocks;
partitioning, by the manager service, a predetermined frequency range into a plurality of sub-ranges;
assigning, by the manager service, each sub-range to a corresponding computing device of the plurality of additional computing devices, each additional computing device computing characteristics of the single block representing the physical model of the acoustic wave device for one or more frequencies within the corresponding assigned sub-range; and
generating, by the computing system, a set of specifications for the acoustic wave device based on the computed characteristics, the set of specifications serving as an input to a manufacturing process.

11. A filter design system, comprising:
a processor;
an interface coupled to the processor; and
memory storing a distributed hierarchical cascading program that, when executed by the processor, causes the filter design system to perform actions comprising:
partitioning a physical model of an acoustic wave device into a plurality of core unit blocks;
assigning each core unit block of the plurality of core unit blocks to a corresponding computing device of a plurality of additional computing devices, each additional computing device computing characteristics for the corresponding core unit block according to a modal matrix based on a first set of basis values;
determining a single block representing the physical model of the acoustic wave device based on the computed characteristics for the core unit blocks; and
generating a set of specifications for the acoustic wave device based on the comparison, the set of specifications serving as an input to a manufacturing process.

12. The filter design system of claim 11, wherein execution of the distributed hierarchical cascading program further causes the filter design system to:
provide the plurality of core unit blocks to at least one additional computing device, the at least one additional computing device combining the plurality of core unit blocks into a single block that subsumes each core unit block by hierarchical cascading sets of adjacent unit blocks into the single block.

13. The filter design system of claim 11, wherein execution of the distributed hierarchical cascading program further causes the filter design system to combine each core unit block into the single block such that the single block subsumes each core unit block by hierarchically cascading sets of adjacent unit blocks into the single block.

14. The filter design system of claim 13, wherein execution of the distributed hierarchical cascading program further causes the filter design system to, for each of one or more sets of adjacent unit blocks of a hierarchical level of a plurality of hierarchical levels, combine sets of adjacent unit blocks at the hierarchical level to create cascaded unit blocks at a next hierarchical level until the single block is created, wherein each of the unit blocks is either a core unit block or a previously cascaded unit block.

15. The filter design system of claim 14, wherein any of the unit blocks that are not combined at the current hierarchical level are transferred from the current hierarchical level to the next hierarchical level.

16. The filter design system of claim 15, wherein a first unit block has previously computed characteristics, and at least one other of the unit blocks is physically and electrically identical to the first unit block, and wherein the first unit block is referenced to assume the previously computed characteristics for the at least one other unit block when combining the sets of adjacent unit blocks at the current hierarchical level.

17. The filter design system of claim 11, wherein the computed characteristics for the first core unit block comprise acoustic and electric fields.

18. The filter design system of claim 11, wherein all of the core unit blocks are physically identical to each other.

19. The filter design system of claim 11, wherein at least two of the core unit blocks are physically different from each other.

20. A filter design system, comprising:
a processor;
an interface coupled to the processor; and
memory storing a distributed hierarchical cascading program that, when executed by the processor, causes the filter design system to perform actions comprising:
partitioning a physical model of an acoustic wave device into a plurality of core unit blocks;
assigning each core unit block of the plurality of core unit blocks to a corresponding computing device of a plurality of additional computing devices, each additional computing device computing characteristics for the corresponding core unit block according to a modal matrix based on a first set of basis values;
determining a single block representing the physical model of the acoustic wave device based on the computed characteristics for the core unit blocks;
partitioning a predetermined frequency range into a plurality of sub-ranges;
assigning each sub-range to a corresponding computing device of the plurality of additional computing devices, each additional computing device computing characteristics of the single block representing the physical model of the acoustic wave device for one or more frequencies within the corresponding assigned sub-range; and
generating a set of specifications for the acoustic wave device based on the comparison, the set of specifications serving as an input to a manufacturing process.

* * * * *